(12) United States Patent
Huang et al.

(10) Patent No.: US 12,533,056 B2
(45) Date of Patent: Jan. 27, 2026

(54) PHYSIOLOGICAL SIGNAL MONITORING DEVICE WITH AN ELECTROSTATIC-DISCHARGE PROTECTIVE MECHANISM

(71) Applicant: BIONIME CORPORATION, Taichung (TW)

(72) Inventors: Chun-Mu Huang, Taichung (TW); Chieh-Hsing Chen, Taichung (TW)

(73) Assignee: BIONIME CORPORATION, Taichung (TW)

( * ) Notice: Subject to any disclaimer, the term of this patent is extended or adjusted under 35 U.S.C. 154(b) by 406 days.

(21) Appl. No.: 16/983,085

(22) Filed: Aug. 3, 2020

(65) Prior Publication Data

US 2021/0030339 A1    Feb. 4, 2021

Related U.S. Application Data

(60) Provisional application No. 62/882,140, filed on Aug. 2, 2019.

(30) Foreign Application Priority Data

Mar. 31, 2020  (TW) ................................ 109110966

(51) Int. Cl.
*H05F 3/04*    (2006.01)
*A61B 5/00*    (2006.01)
(Continued)

(52) U.S. Cl.
CPC ........ *A61B 5/14546* (2013.01); *A61B 5/0002* (2013.01); *A61B 5/14503* (2013.01);
(Continued)

(58) Field of Classification Search
CPC .............. A61B 5/14546; A61B 5/0002; A61B 5/14503; A61B 5/14532;
(Continued)

(56) References Cited

U.S. PATENT DOCUMENTS 7,285,846 B1 * 10/2007 Tran ...................... H01L 23/495
                                                               257/667
2010/0228111 A1    9/2010 Friman et al.
(Continued)

FOREIGN PATENT DOCUMENTS

| CA | 3009449 A1 | 6/2017 |
| EP | 2335584 B1 | 6/2015 |

(Continued)

OTHER PUBLICATIONS

Search Report issued to European counterpart application No. 20189215.5 by the EPO on Jan. 15, 2021.
(Continued)

*Primary Examiner* — Alex M Valvis
*Assistant Examiner* — Grace L Rozanski
(74) *Attorney, Agent, or Firm* — Perkins Coie LLP; Viola Kung; Sean Lee

(57) ABSTRACT

A physiological signal monitoring device includes a base and a transmitter. The base is provided with a biosensor. The transmitter is removably coupled to the base, and includes a casing and an electrostatic-discharge protective unit. The casing has a socket for the biosensor to be removably inserted thereinto. The electrostatic-discharge protective unit is disposed to at least surround the periphery of the socket to dispel static electricity when electrostatic discharge occurs.

9 Claims, 20 Drawing Sheets

(51) Int. Cl.
  *A61B 5/145*     (2006.01)
  *H01R 13/648*    (2006.01)
  *H05K 5/00*      (2025.01)
  *H05K 5/10*      (2025.01)

(52) U.S. Cl.
  CPC .......... *H01R 13/6485* (2013.01); *H05F 3/04* (2013.01); *H05K 5/0047* (2013.01); *H05K 5/10* (2025.01); *A61B 5/14532* (2013.01); *A61B 2560/0214* (2013.01); *A61B 2560/045* (2013.01); *A61B 2562/182* (2013.01)

(58) Field of Classification Search
  CPC ...... A61B 2560/0214; A61B 2560/045; A61B 2562/182; H01R 13/6485; H05F 3/04; H05K 5/0004; H05K 5/0047
  See application file for complete search history.

(56) References Cited

U.S. PATENT DOCUMENTS

| | | | |
|---|---|---|---|
| 2011/0077490 A1 | 3/2011 | Simpson et al. | |
| 2014/0206976 A1* | 7/2014 | Thompson | A61B 5/25 600/391 |
| 2017/0095645 A1* | 4/2017 | Toth | A61M 25/09041 |
| 2017/0188910 A1* | 7/2017 | Halac | A61B 5/14546 |
| 2017/0188912 A1 | 7/2017 | Halac et al. | |
| 2018/0271414 A1 | 9/2018 | Deck et al. | |
| 2018/0317820 A1* | 11/2018 | Pace | A61B 50/3001 |
| 2018/0358352 A1* | 12/2018 | Voldman | H01L 27/0255 |
| 2019/0227022 A1 | 7/2019 | Harley-Trochimeczyk et al. | |
| 2022/0095968 A1* | 3/2022 | Wang | A61B 5/1468 |

FOREIGN PATENT DOCUMENTS

| | | |
|---|---|---|
| JP | H07312264 A | 11/1995 |
| JP | 2005174696 A | 6/2005 |
| JP | 2011204483 A | 10/2011 |
| TW | 201827819 A | 8/2018 |
| WO | 02068015 A2 | 9/2002 |
| WO | 2017116915 A1 | 7/2017 |
| WO | 2019005627 A1 | 1/2019 |

OTHER PUBLICATIONS

Examination Report issued to Australian counterpart application No. 2020213274 by the IP Australia on Mar. 10, 2021.

* cited by examiner

PHYSIOLOGICAL SIGNAL MONITORING DEVICE WITH AN ELECTROSTATIC-DISCHARGE PROTECTIVE MECHANISM

CROSS-REFERENCE TO RELATED APPLICATION

This application claims priority of U.S. Provisional Patent Application No. 62/882,140, filed on Aug. 2, 2019, and priority of Taiwanese Invention Patent Application. No. 109110966, filed on Mar. 31, 2020.

FIELD

The disclosure relates to a physiological signal monitoring device, and more particularly to a physiological signal monitoring device with an electrostatic-discharge protective mechanism.

BACKGROUND

Continuous glucose monitoring (GCM) is a popular method for tracking changes in blood glucose levels by taking glucose measurements of an individual at regular intervals. In order to utilize a CGM system, the individual wears a form of compact, miniature sensing device, which at least includes a biosensor for sensing physiological signal corresponding to the glucose level of a host, and a transmitter for receiving and transmitting the abovementioned physiological signal.

The biosensor and the transmitter of a conventional GCM system are separately packaged, and are assembled right before use. Static electricity may accumulate on the biosensor and the transmitter during transport or packaging, and may damage the biosensor and internal electronic components of the transmitter. In addition, the electrostatic-discharge issue will become serious along with the miniaturization of the biosensor and the transmitter so as to affect the operation and lifespan of the product.

SUMMARY

Therefore, an object of the disclosure is to provide a physiological signal monitoring device that can alleviate the drawback of the prior art.

According to one aspect of the disclosure, the physiological signal monitoring device is adapted for monitoring a physiological parameter of at least one analyte of a host, and includes a base and a transmitter. The base is adapted to be mounted to a skin surface of the host, and is provided with a biosensor. The biosensor has a sensing section and a signal output section. The sensing section of the biosensor is adapted to be inserted underneath the skin surface of the host for measuring at least one physiological signal corresponding to the physiological parameter of the host, and outputting the physiological signal via the signal output section. The transmitter is removably coupled to the base, and includes a casing and an electrostatic-discharge protective unit. The casing defines an inner space therein for receiving a circuit board, and has a connecting surface facing the base. The connecting surface is provided with a connecting port. The connecting port has a socket that is communicated with the inner space and that is for the signal output section of the biosensor to be removably inserted thereinto, so as to permit the biosensor to be coupled to the circuit board and to output the physiological signal to the circuit board for processing the physiological signal. The electrostatic-discharge protective unit is at least disposed to the periphery of the socket of the connecting port for bearing and dispelling static electricity when electrostatic discharge occurs.

According to another aspect of the disclosure, the physiological signal monitoring device adapted for monitoring a physiological parameter of at least one analyte of a host, and includes abase and a transmitter. The base is adapted to be mounted to a skin surface of the host, and is provided with a biosensor. The biosensor has a sensing section and a signal output section. The sensing section of the biosensor is adapted to be inserted underneath the skin surface of the host for measuring at least one physiological signal corresponding to the physiological parameter of the host, and outputting the physiological signal via the signal output section. The transmitter is removably coupled to the base, and includes a casing. The casing defines an inner space therein for receiving a circuit board, and has a side that faces the base and that is provided with a connecting port. The connecting port has a socket that is communicated with the inner space and that is for the signal output section of the biosensor to be removably inserted thereinto, so as to permit the biosensor to be coupled to the circuit board and to output the physiological signal to the circuit board for processing the physiological signal. At least the connecting port of the casing is made of a conductive material to serve as an electrostatic-discharge protective unit that is for bearing and dispelling static electricity when electrostatic discharge occurs.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
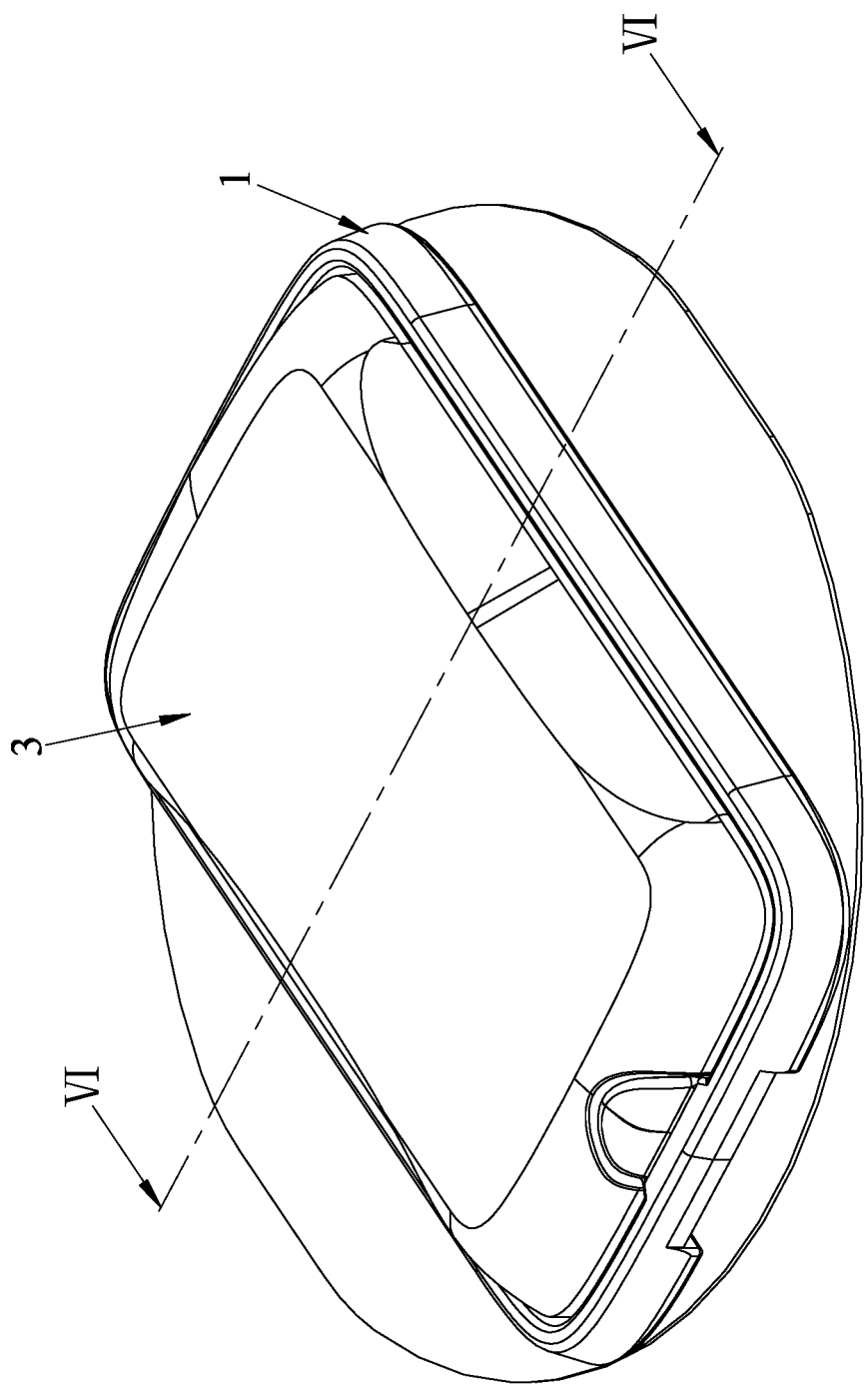
FIG. 1 is a perspective view of a first embodiment of a physiological signal monitoring device according to the disclosure.

Before the disclosure is described in greater detail, it should be noted that where considered appropriate, reference numerals or terminal portions of reference numerals have been repeated among, the figures to indicate corresponding or analogous elements, which may optionally have similar characteristics.

In addition, in the description of the disclosure, the terms "up", "down", "top", "bottom" are meant to indicate relative position between the elements of the disclosure, and are not meant to indicate the actual position or each of the elements in actual implementations. Similarly, various axes to be disclosed herein, while defined to be perpendicular to one another in the disclosure, may not be necessarily perpendicular in actual implementation.

Figure 2:
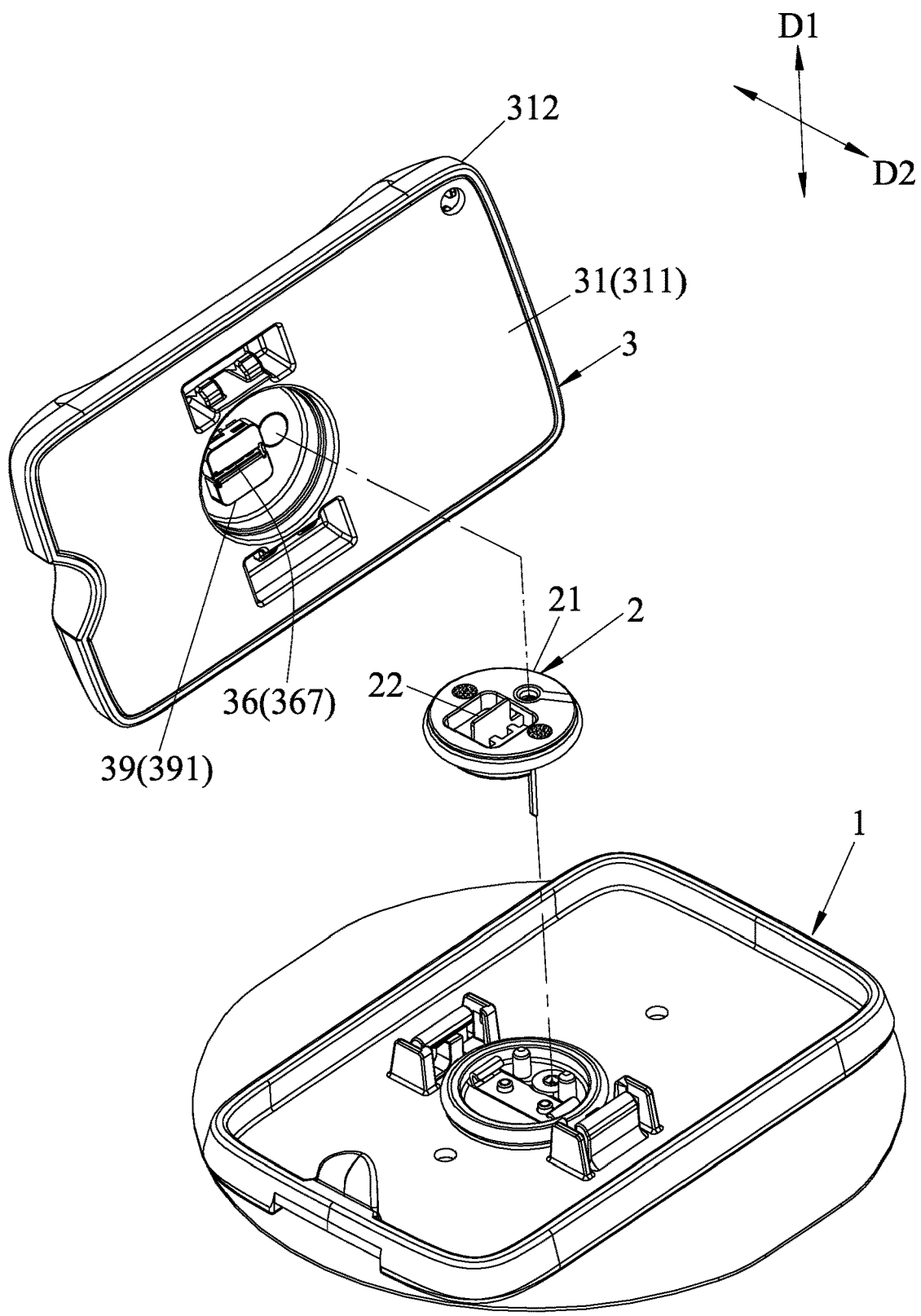
FIG. 2 is an exploded perspective view illustrating the first embodiment.

Referring to FIGS. 1 and 2, a first embodiment of the physiological signal monitoring device with an electrostatic-discharge protective mechanism according to the disclosure is adapted to be mounted to a skin surface of a host (not shown), and is adapted for measuring at least one analyte of the host and for sending a corresponding physiological signal. In this embodiment, the physiological signal monitoring device is for measuring the blood glucose concentration in the interstitial fluid (ISF) of the host, but is not restricted to such.

The physiological signal monitoring device includes a base 1 that is adapted to be mounted to the skin surface of the host, a biosensor 2 that is mounted to the base 1 and that is adapted to be partially inserted underneath the skin surface of the host, and a transmitter 3 that is removably covered to the base 1 in a direction of a first axis (D1) and that is connected to the biosensor 2. The biosensor 2 is adapted for measuring the physiological parameter of the analyte of the host and for sending a corresponding physiological signal to the transmitter 3, while the transmitter 3 receives, processes, and outputs the physiological signal to an external device 800 (see FIG. 13) for monitoring purposes.

Figure 3:
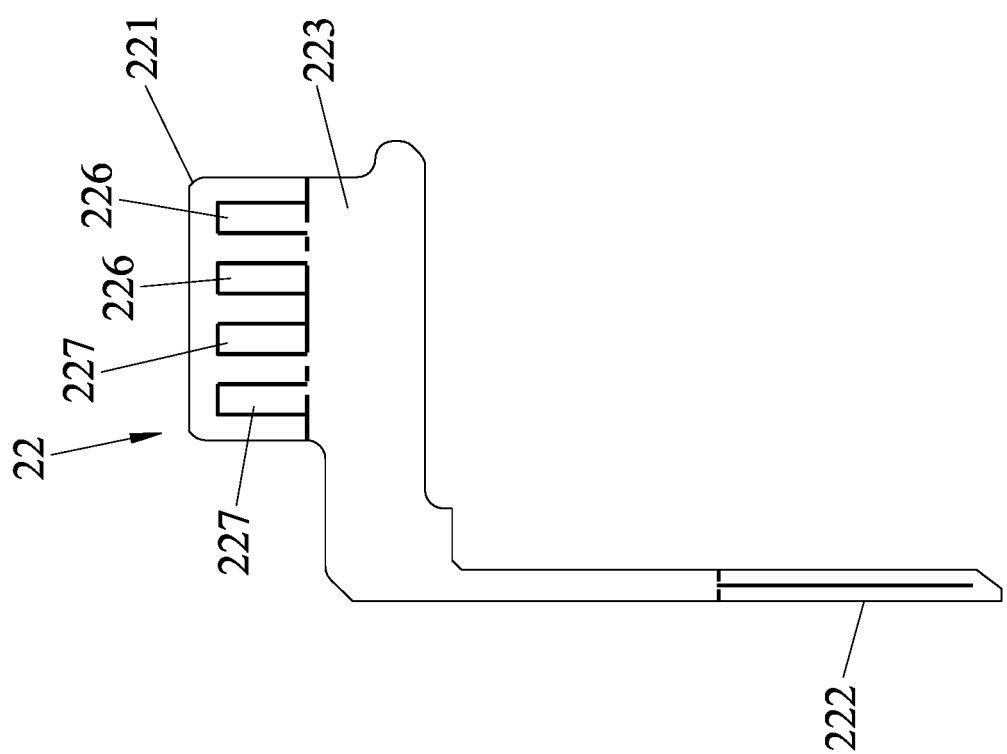
FIG. 3 is a side view illustrating a sensing member of the first embodiment.

Referring to FIGS. 2 and 3, in this embodiment, the biosensor 2 includes a mounting seat 21 that is mounted to the base 1, and a sensing member 22 that is carried by and mounted to the mounting seat 21. The sensing member 22 has a sensing section 222 that is adapted to be inserted underneath the skin surface of the host, a signal output section 221 that is electrically connected to the transmitter 3, and an extended section 223 that interconnects the sensing and signal output sections 222, 221. The sensing section 222 is adapted for measuring the physiological parameter of the at least one analytical substance of the host, while the signal output section 221 is adapted for sending the corresponding physiological signal to the transmitter 3 after receiving information from the sensing section 222 via the extended section 223. The extended section 223 is covered with an insulating material. In addition, the sensing member 22 has a plurality of electrodes 226 disposed thereon. The number and types of electrodes 226 are primarily designed account for the type of analytical substances measured, and is not restricted to the ones shown in the disclosure. For the sake for clarity, detailed structures of the sensing member 22 is only showcased in FIG. 3.

Referring to FIGS. 1 to 6, the transmitter 3 includes a casing 31 that defines an inner space 30 therein, a circuit board 33 that is disposed in the inner space 30, a processing unit 34 (see FIG. 12) that is disposed in the inner space 30 and that is mounted to the circuit board 33, a battery 35 that is disposed in the inner space 30 and that is coupled to the circuit board 33, a connecting port 36 that protrudes from the casing 31, a plurality of second conductive mediums 37 that are mounted to the connecting port 36, and an electrostatic-discharge protective unit 39 that is disposed on an outer surface 361 of the connecting port 36.

Specifically, the casing 31 includes a bottom portion 311 and a top portion 312. The bottom portion 311 and the top portion 312 are two casing parts corresponding in shape, and cooperatively define the inner space 30 therebetween. The casing 31 has a connecting surface 311b that faces the base 1 and that is connected to the base 1. In this embodiment, the casing 31 is connected to the base 1 via the bottom portion 311 thereof, so the connecting surface 311b is a bottom surface of the bottom portion 311. In a modification, the transmitter 3 may be connected to the base 1 at a lateral side thereof, so the connecting surface 311b may be a lateral surface of the transmitter 3. The circuit board 33 has a plurality of first electrical contacts 332 and a plurality of second electrical contacts 331. The battery 35 may be a button cell (see FIG. 4) or a rechargeable battery. The connecting port 36 may be provided on the connecting surface 311b.

Figure 12:
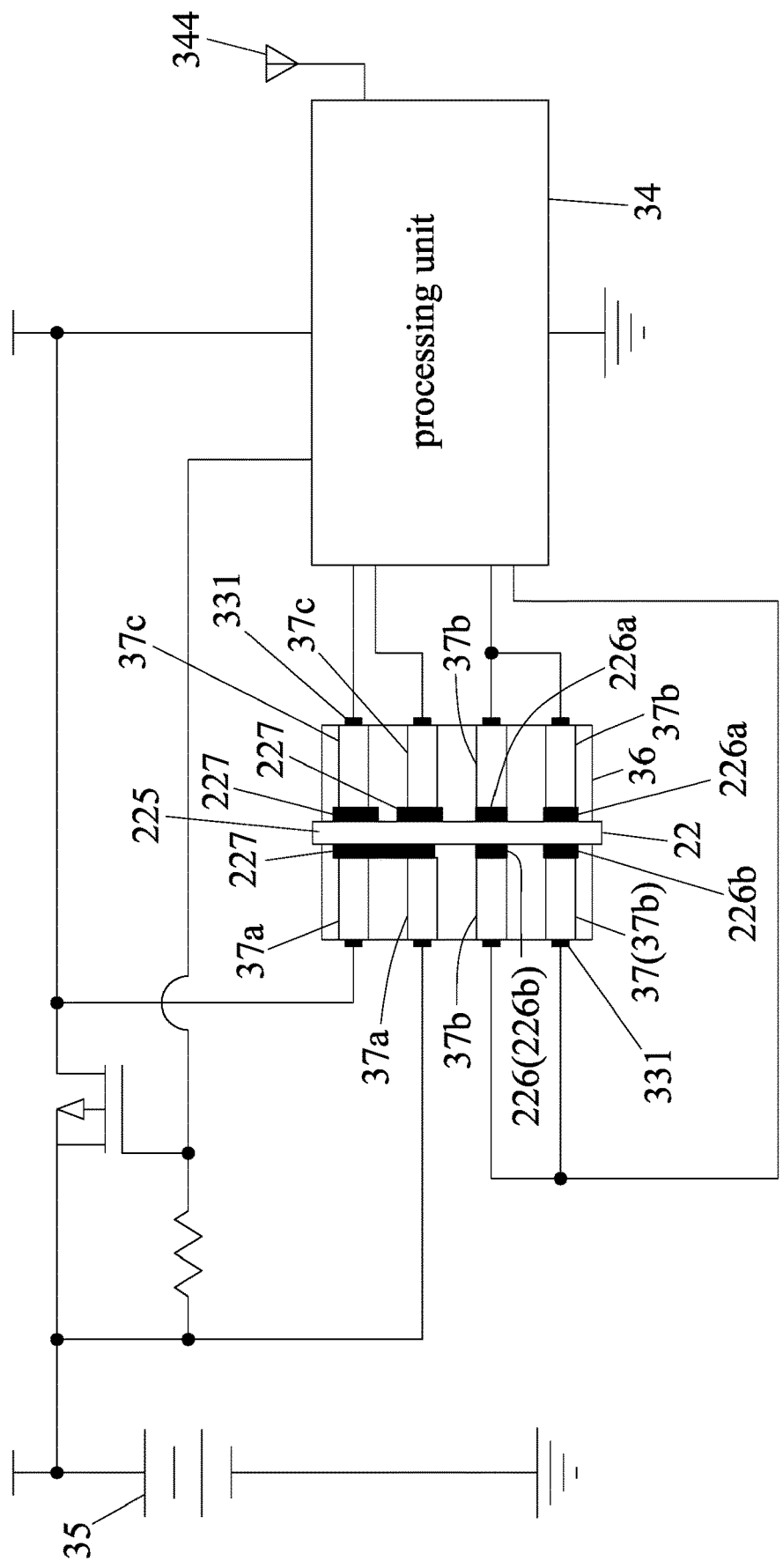
FIG. 12 is a circuit diagram illustrating the transmitter coupled with the sensing member.
Figure 13:
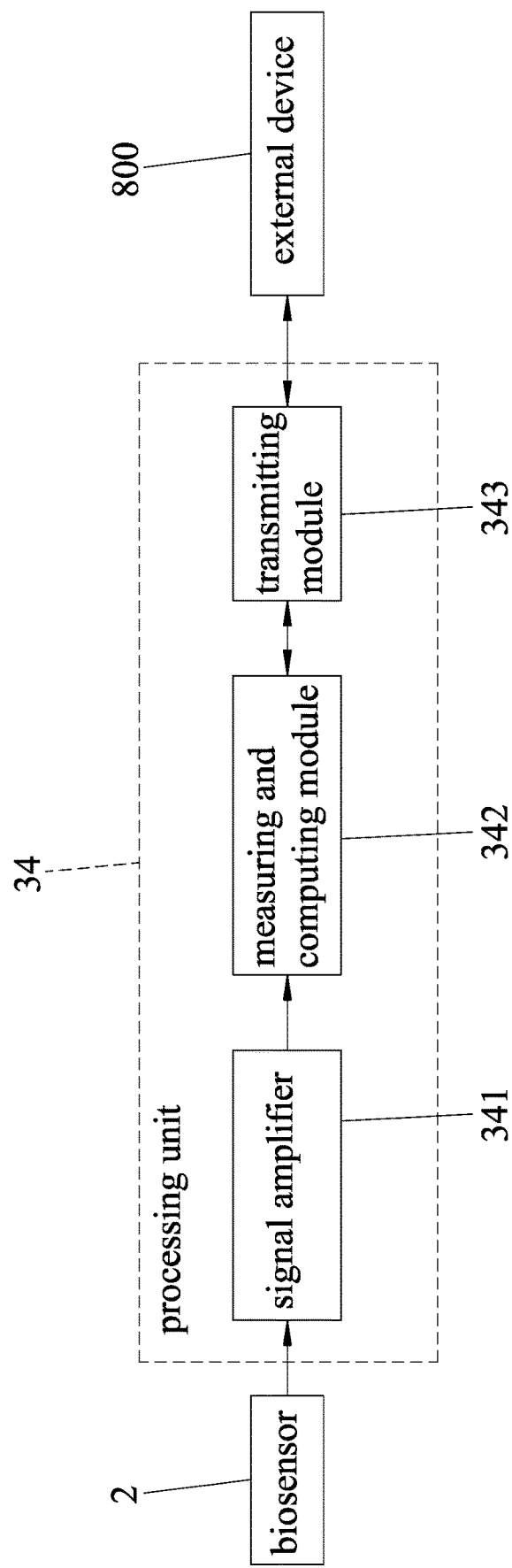
FIG. 13 is a block diagram illustrating the first embodiment.

Referring to FIGS. 12 and 13, the processing unit 34 is for receiving the electric signal from the sensing member 22 and for sending a corresponding glucose level signal. The processing unit 34 includes a signal amplifier 341 that is for receiving and amplifying the electric signal, a measuring and computing module 342 that converts toe amplified electric signal sequentially into a corresponding digital signal and then to the corresponding glucose level signal, and a transmitting module 343 that transmits the corresponding glucose level signal to the external device 800 via an antenna 344. The measuring and computing module 342 may include an analog-digital signal converter and a processor. The transmitting module 343 may be wireless transmission means. The configuration of the processing unit 34 is not limited to the above.

Figure 4:
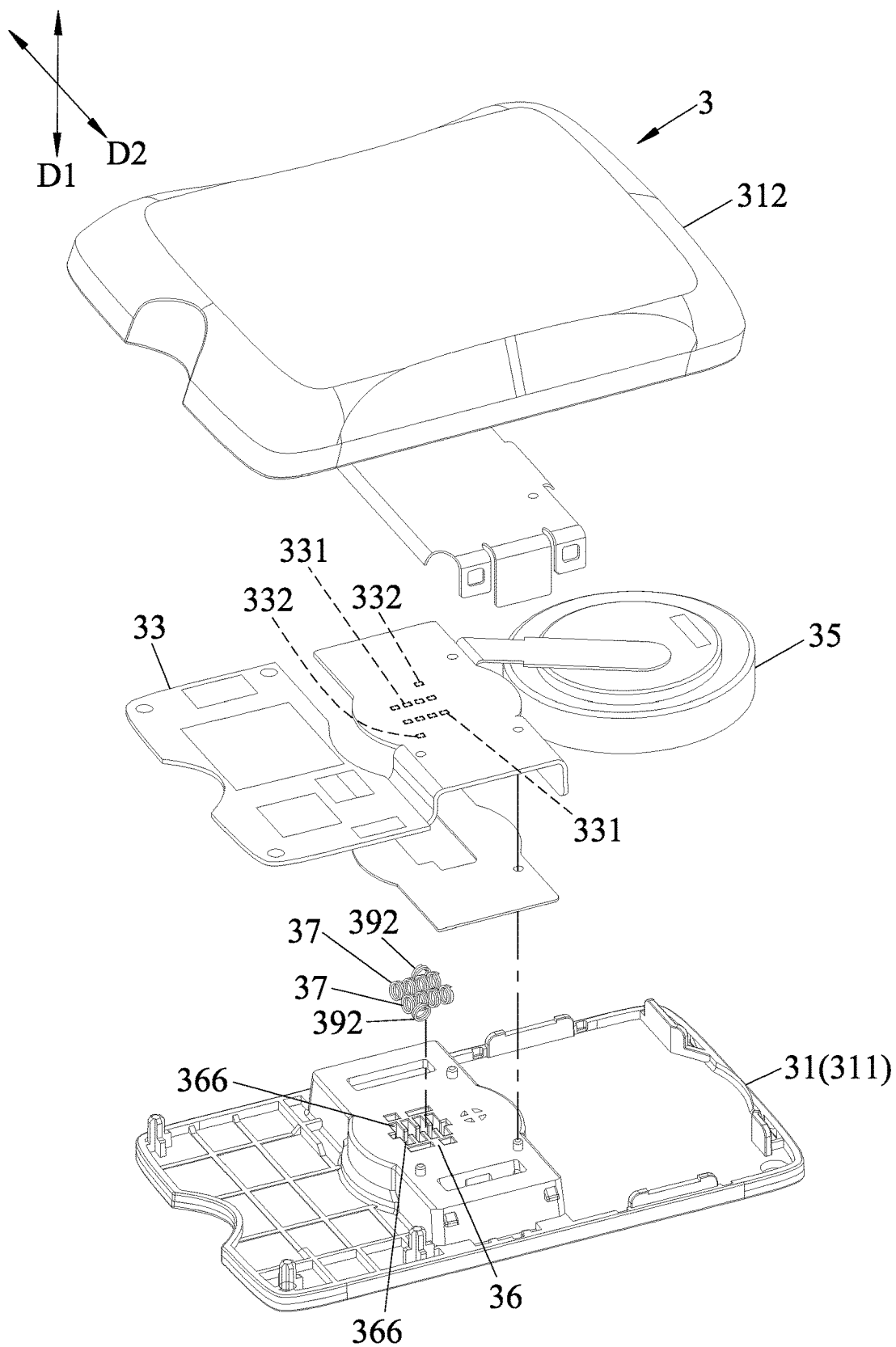
FIG. 4 is an exploded perspective view illustrating a transmitter of the first embodiment.
Figure 5:
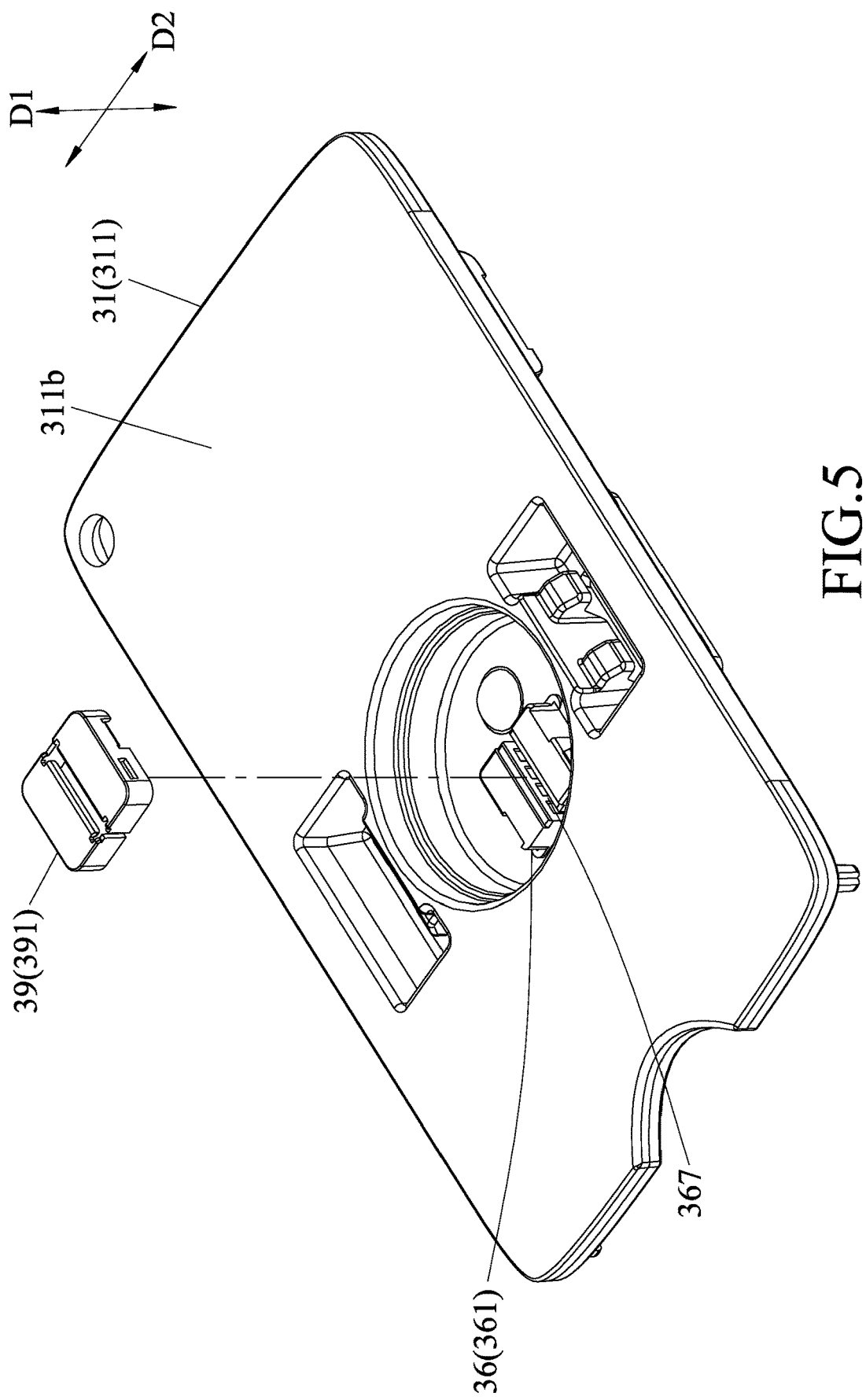
FIG. 5 is a perspective view illustrating a bottom portion of a casing of the transmitter with a connecting portion and an electrostatic-discharge protective unit.
Figure 6:
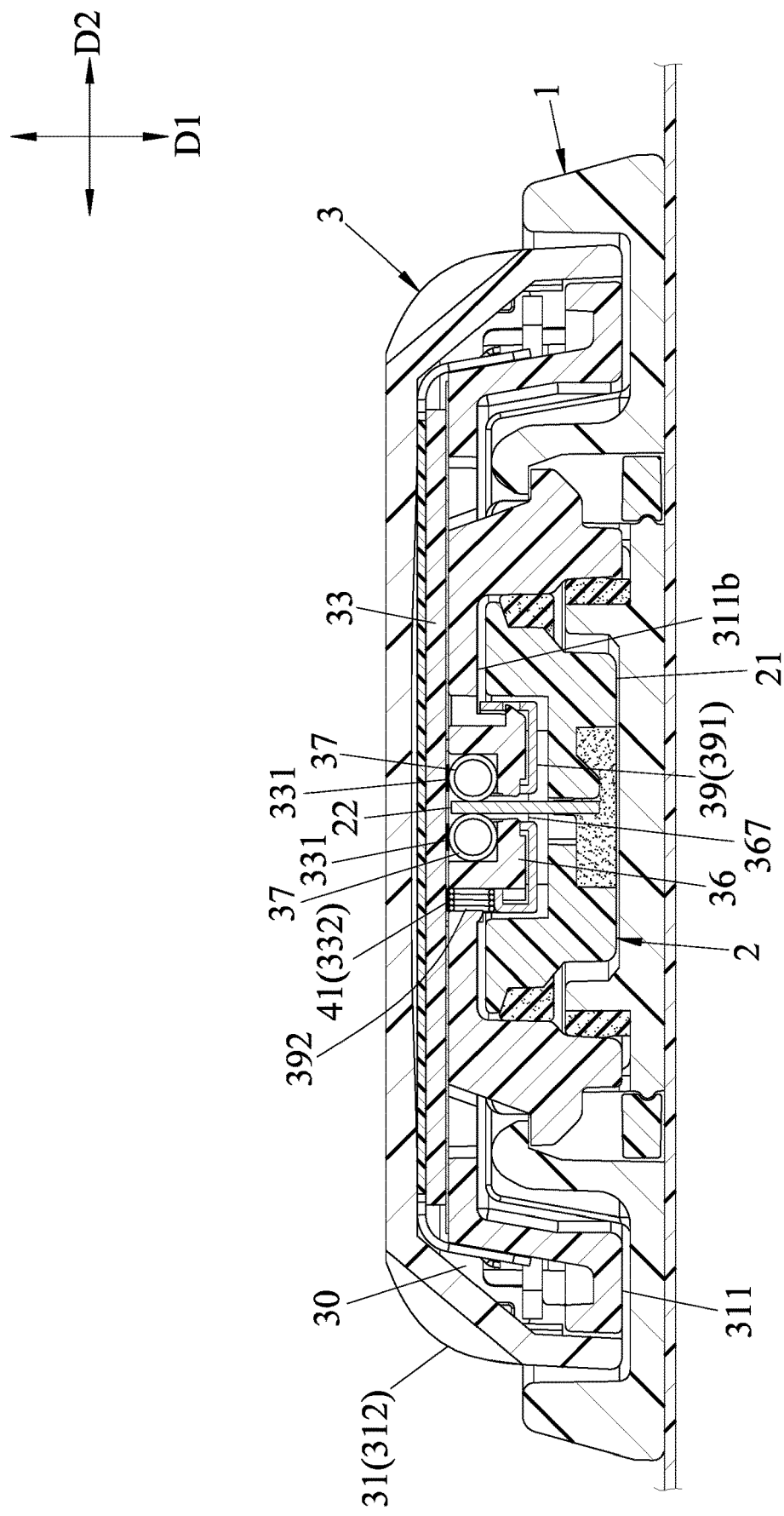
FIG. 6 is a sectional view taken along line VI-VI in FIG. 1.
Figure 8:
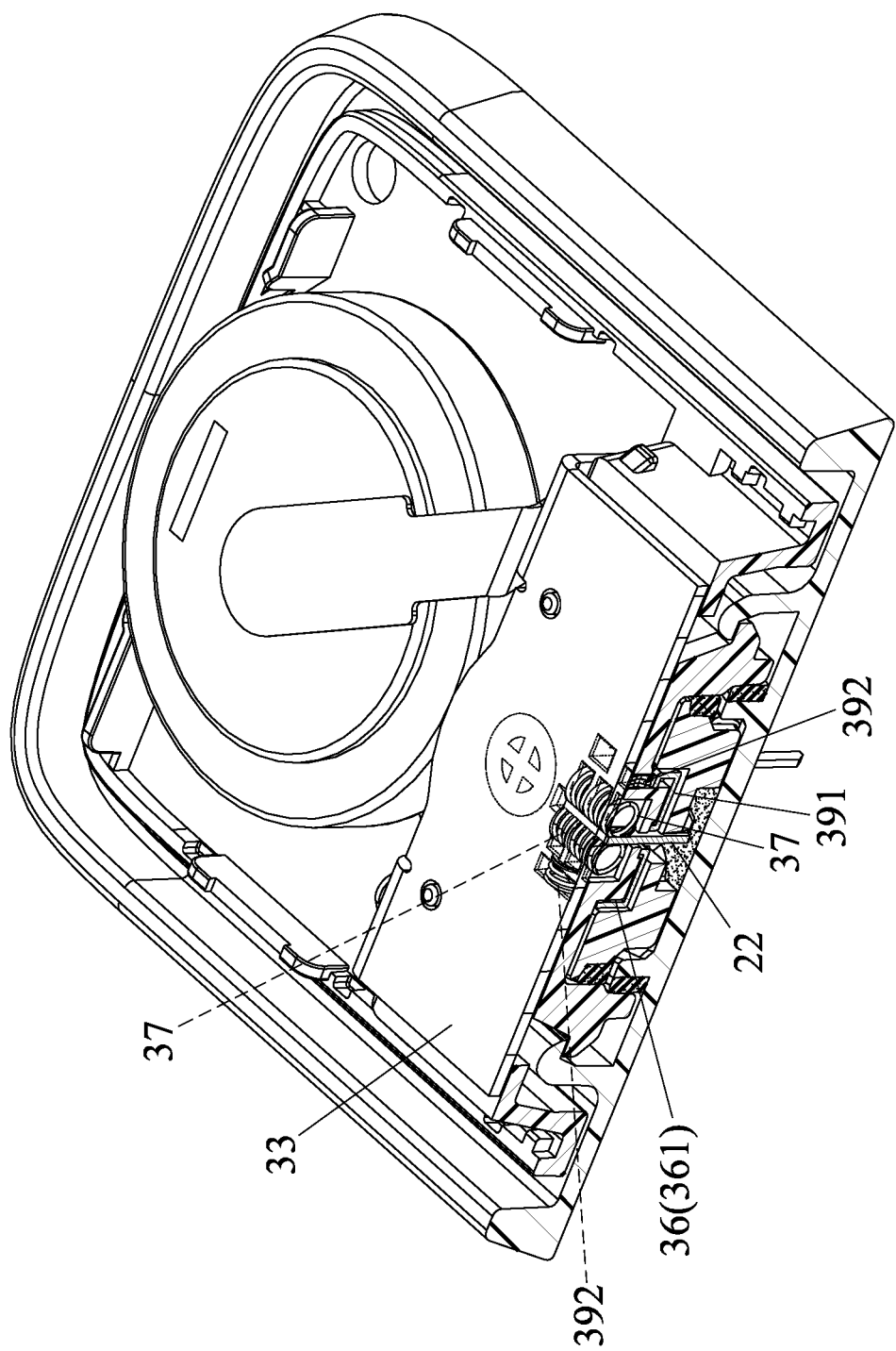
FIG. 8 is a cutaway perspective view illustrating the first embodiment.

Referring to FIGS. 4, 6 and 8, the connecting port 36 has a socket 367 that is communicated with the inner space 30 and that is for the signal output section 221 of the sensing member 22 to be removably inserted thereinto. In this embodiment, the connecting port 36 further has a plurality of mounting grooves 366 that open toward the circuit board 33 and that are communicated with the socket 367. The second conductive mediums 37 are respectively received in the mounting grooves 366. Each of the second conductive mediums 37 is in contact with a respective one of the second electrical contacts 331 of the circuit board 33 at a side thereof. When the sensing member 22 is inserted into the connecting port 36 of the transmitter 3 via the socket 367, each of the second conductive mediums 37 is in contact with the signal output section 221 of the sensing member 22 at another side thereof, so that the sensing member 22 is electrically coupled to the circuit board 33. Specifically, as shown in FIGS. 6 and 8, the second conductive mediums 37 are disposed in the mounting grooves 366 located at two opposite sides of the socket 37 to contact two opposite lateral sides of the signal output section 221 of the sensing member 22 for clamping the sensing member 22. Each of the second conductive mediums 37 is a conductive elastomer. Specifically, each of the second conductive mediums 37 may be a coil spring, an elastic plate or a conductive rubber, but is not limited to such.

Figure 11:
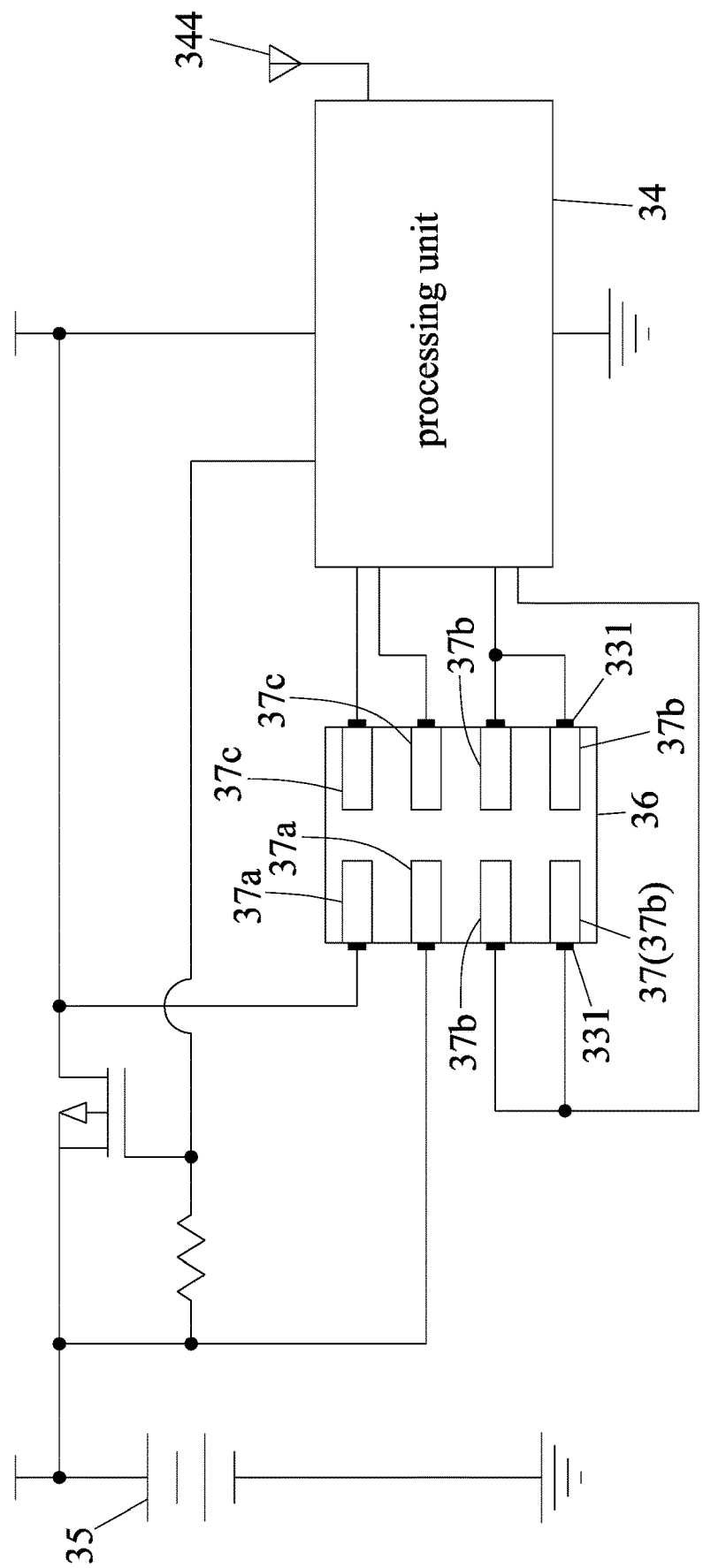
FIG. 11 is a circuit diagram illustrating the transmitter.

Referring to FIGS. 11 and 12, the second conductive mediums 37 include a plurality of power-supplying conductive mediums 37a, a plurality of biosensing conductive mediums 37b, and a plurality of transmitting conductive mediums 37c. The number the power-supplying conductive mediums 37a is two, and the power-supplying conductive mediums 37a cooperatively form a switch. In this embodiment, the number of the biosensing conductive mediums 37b is four. The biosensing conductive mediums 37b are cooperated with the outputs of the electrodes 226 of the sensing member 22, but are not limited to such.

Referring to FIGS. 3 and 12, the sensing member 22 in this embodiment consists of a substrate 225, the electrodes 226 that are disposed on at least one surface of the substrate 225 and that extend from the sensing section 222 to the signal output section 221 of the sensing member 22, a plurality of electrical contact regions 227, and a sensing layer (not shown) that covers a portion of at least one of the electrodes 226 located at the sensing section 222 of the sensing member 222. The sensing layer is for reacting with the at least one analyte of the host, and the electrodes 226 detect outcome of the reaction, and generate an electric signal indicating the outcome of the reaction. In this embodiment, the electric signal is the physiological signal that indicates glucose levels in the interstitial fluid. In this embodiment, the number of the electrodes 226 is four, and the electrodes 226 are disposed on two opposite surfaces of the sensing member 22. Portions of the electrodes 226 at the signal output section 221 of the sensing member 22 are electrically connected to the circuit board 33 via the biosensing conductive mediums 37b. The electrodes 226 include two working electrodes 226a and two reference electrodes 226b. In a modification, the electrodes 226 may include two working electrodes 226a and a counter electrode, or include a working electrode 226a and two counter electrodes.

Referring to FIG. 11, when the sensing member 22 is not inserted into the socket 367 of the connecting port 36, the battery 35 is in a non-power supplying state. Referring to FIG. 12, when the sensing member 22 is inserted into the socket 367, the electrical contact regions 227 of the sensing member 22 electrically contact the power-supplying conductive mediums 37a, and the working electrodes 226a of the sensing member electrically contact two of the biosensing conductive mediums 37b, such that the switch is in a closed circuit state and the battery 35 is switched to a power supplying state for supplying power to the sensing member 22 and the processing unit 34 for performing measurement of the analyte and sending the physiological signal to the external device 800.

In addition, the socket 367 of the connecting port 36 is further adapted for an cuter transmission device (not shown) or a charging device (not shown) to be inserted thereinto. For example, after the transmitter 3 is completely assembled with the outer transmission device, a connector (or an electrode) of the outer transmission device may be inserted into the socket 367 so that the outer transmission device and the processing unit 34 are permitted to exchange data through the transmitting conductive mediums 37c. In other words, in this embodiment, the transmitting conductive mediums 37c are permitted to be electrically connected to the outer transmission device for exchanging data (default data or calibration data) during fabrication of the transmitter 3.

When fabricating or selling the physiological signal monitoring device according to the disclosure, the transmitter 3 and the base 1 are separately packaged, so a user have to unpack the transmitter 3 and the base 1 so as to mount the transmitter 3 onto the base 1 (and to insert the sensing member 22 of the biosensor 2 into the socket 367 of the transmitter 3) for using the physiological signal monitoring device. During fabrication, packaging, unpacking and installation of the transmitter 3, the base 1 and the biosensor 2, static electricity may accumulate on the surfaces of the transmitter 3, the base 1 and the biosensor 2. Moreover, in this embodiment, signal transmission, data transmission, charge and startup of the physiological signal monitoring device are executed via the socket 367. Due to miniaturization of the physiological signal monitoring device, distances among electronic components of the physiological signal monitoring device are relatively short. If the static electricity is not promptly dispelled, the electronic components of the physiological signal monitoring device may be easily damaged. As such, in this embodiment, the electrostatic-discharge protective unit 39 is disposed to at least surround the periphery of the socket 367 of the connecting port 36 to bear and dispel the static electricity for preventing to-be-protect components of the physiological signal monitoring device from being damaged by the static electricity via the socket 367 when electrostatic discharge occurs. In this embodiment, the to-be-protect components include the processing unit 34 and other electronic components on the circuit board 33, and the signal output end 221 of the sensing member 22 that is inserted into the connecting port 36.

Figure 7:
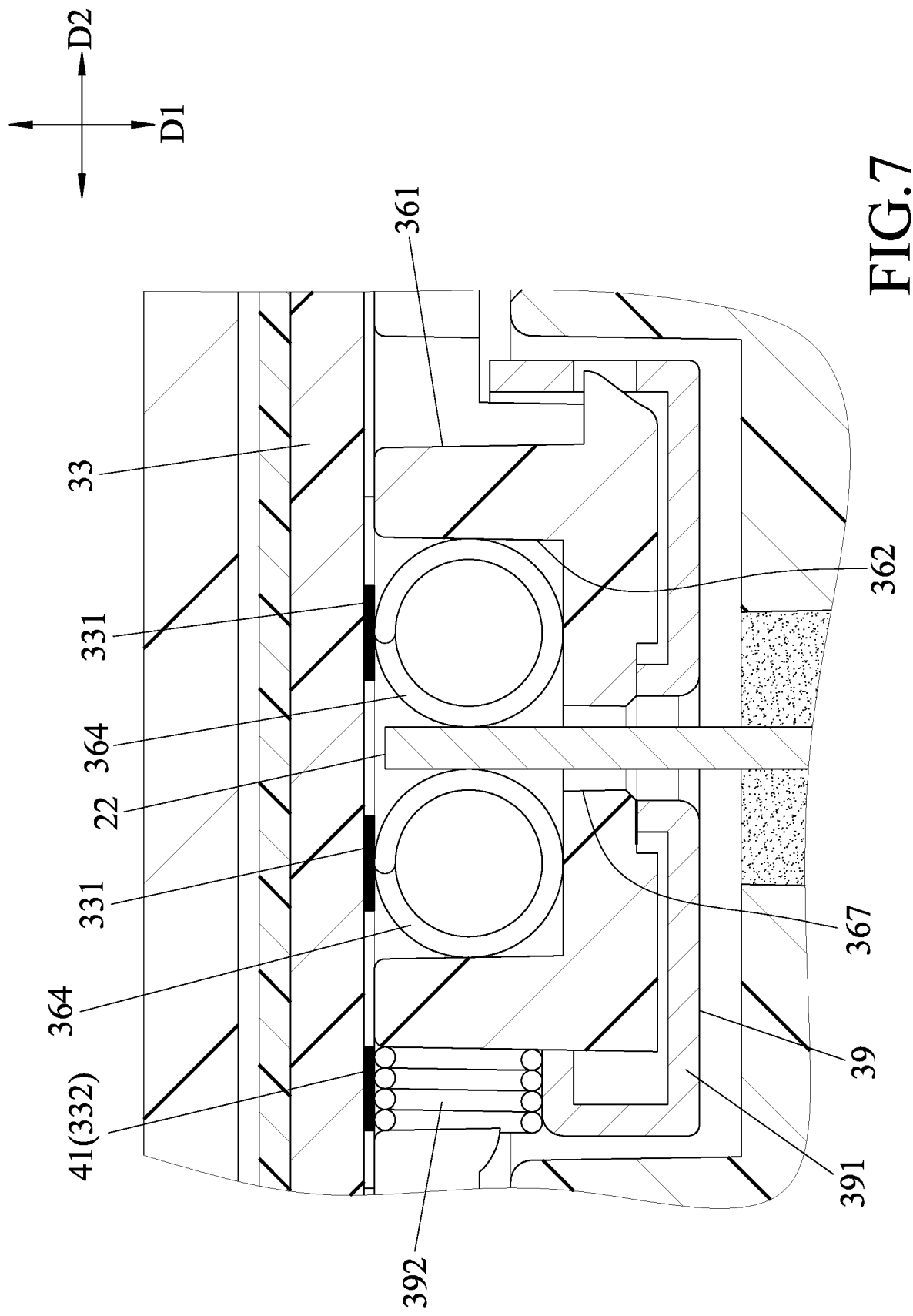
FIG. 7 is an enlarged view of FIG. 6.

The electrostatic-discharge protective unit 39 is coupled to a potential balance unit 41 (see FIGS. 6 and 7) so as to conduct the unbalanced electric charges, to dispel instantaneous potential difference caused by the static electricity and to balance the potential. In this embodiment, the potential balance unit 41 includes the first electrical contacts 332 on the circuit board 33. The first electrical contacts 332 are low potential points, and specifically are ground points. The electrostatic-discharge protective unit 39 is coupled to the first electrical contacts 332 to dispel unbalanced electric charges. In a modification, the potential balance unit 41 may include a protection circuit that is disposed on the circuit board 33 and that has the first electrical contacts 332. The electrostatic-discharge protective unit 39 is coupled to the first electrical contacts 332. The protection circuit bears instantaneous high voltage/current caused by the electrostatic discharge by virtue of transient voltage suppressor (TVS) so as to limit the potential difference between positive and negative electrodes within a predetermined range, dispels the unbalanced electric charges caused by the electrostatic discharge via the ground points, or shields the electronic components by balancing the input voltage. In another modification, the potential balance unit 41 may be configured as a metal casing or a metal plate (not shown) that is located between the casing 31 and the circuit board 33, and the electrostatic-discharge protective unit 39 is coupled to the metal casing or the metal plate. By the abovementioned implementation manners of the potential balance unit 41, the electrostatic-discharge protective unit 39 can conduct the unbalanced electric charges thereto for balancing the potential. However, the configuration of the potential balance unit 41 may be varied by one skilled in the art depending on different demands, and is not limited to such.

In this embodiment, the electrostatic-discharge protective unit 39 includes an electrostatic-discharge protective component 391 that covers the outer surface 361 of the connecting port 36 and that surrounds the periphery of the socket 367. The electrostatic-discharge protective component 391 is at least adjacent to the periphery of the socket 367. The electrostatic-discharge protective component 391 is casing-shaped, and is made of metal or other conductive materials. Specifically, the electrostatic-discharge protective component 391 is a casing made of stainless steel. In a modification, the electrostatic-discharge protective component 391 may be a casing made of insulation material and applied with a conductive layer. In another modification, the electrostatic-discharge protective component 391 may be configured as a metal plate, and is not limited to be casing-shaped.

In this embodiment, the electrostatic-discharge protective unit 39 further includes at least one first conductive medium 392 that is disposed between the circuit board 33 and the electrostatic-discharge protective component 391. Specifically, in this embodiment, the electrostatic-discharge protective unit 39 includes two first conductive mediums 392. The first conductive mediums 392 are resilient components, and abut against the first electrical contacts 332 of the circuit board 33 and the electrostatic-discharge protective component 391. As such, a steady circuit is formed between the electrostatic-discharge protective component 391 and the circuit board 33 so as to ensure that the electrostatic-discharge protective component 391 will bear and dispel the unbalanced electric charges to the first electrical contacts 332 via the first conductive mediums 392 when electrostatic discharge occurs. Then, the unbalanced electric charges will be grounded. In detail, each of the first conductive mediums 392 is configured as a coil spring, and abuts against the circuit board 33 and the electrostatic-discharge protective component 391 at radial ends thereof in the direction of the first axis (D1). The electrostatic-discharge protective component 391 cooperates with the connecting port 36 to limit the first conductive mediums 392 for stabilizing and miniaturizing the structure of the transmitter 3 and for stably dispelling the static electricity.

Figure 9:
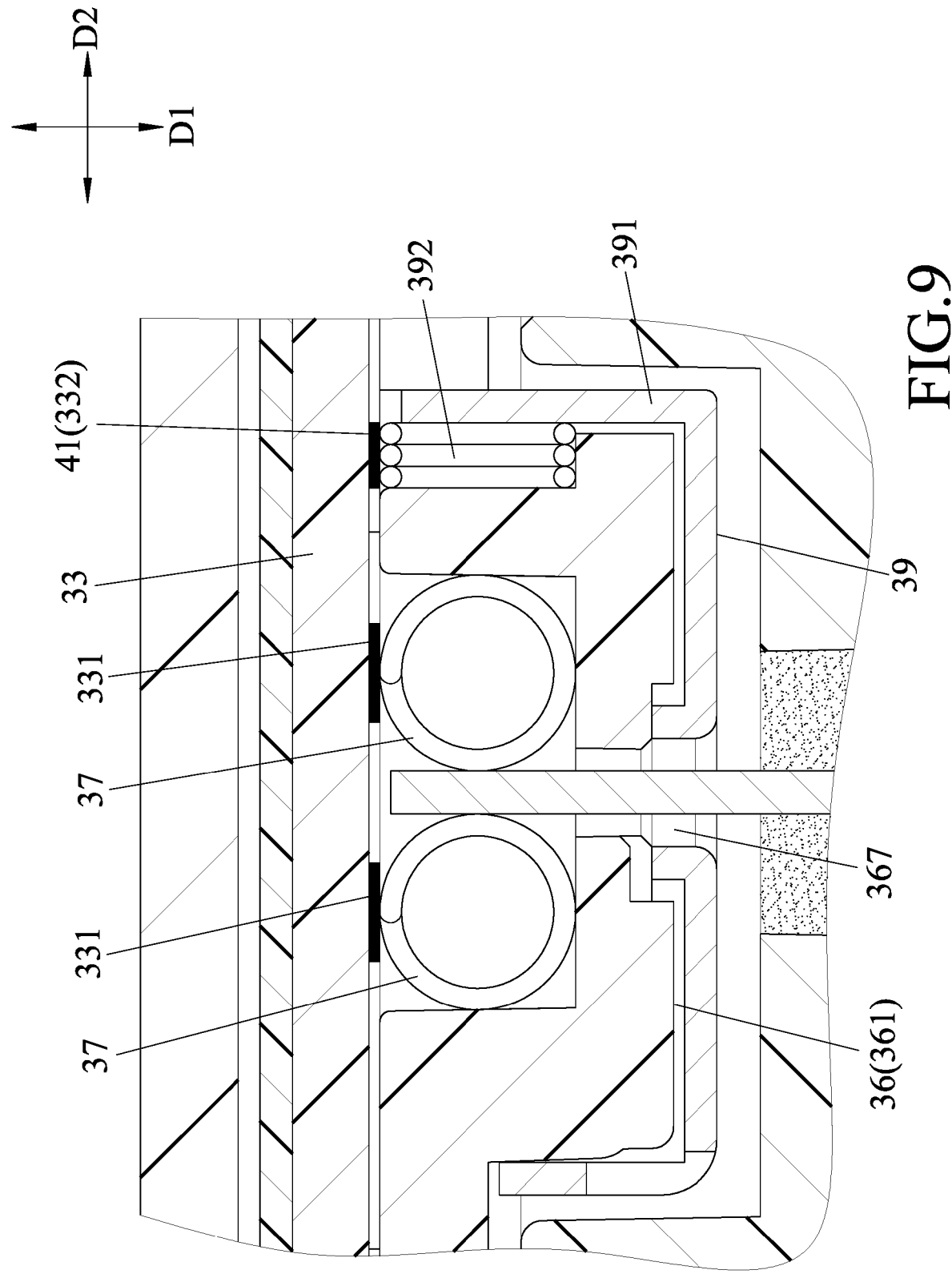
FIG. 9 is a fragmentary sectional view illustrating a modification of the first embodiment.
Figure 10:
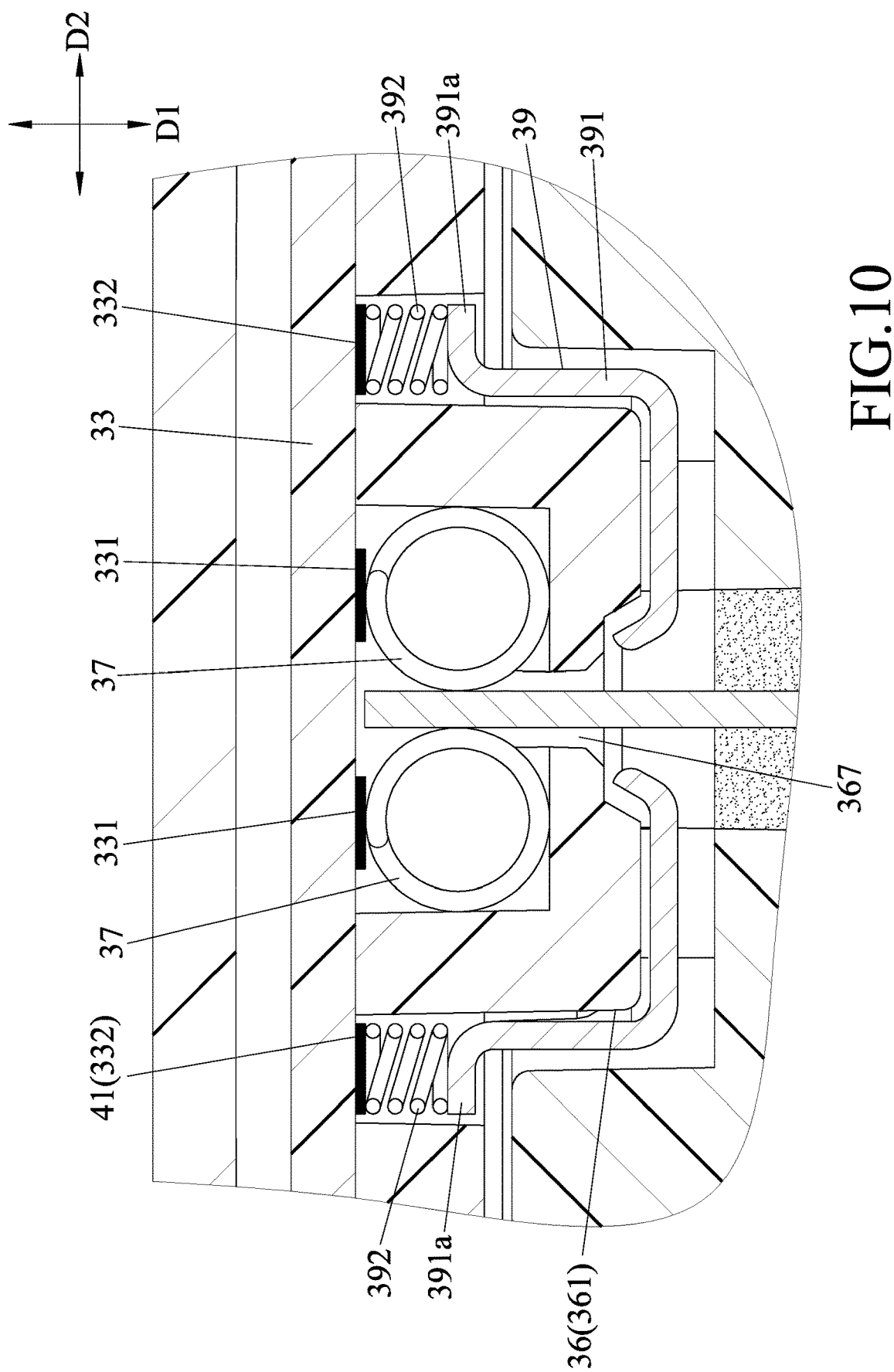
FIG. 10 is a fragmentary sectional view illustrating another modification of the first embodiment.

Referring to FIG. 9, in a modification, the first conductive medium 392 may abut against the first electrical contact 332 of the circuit board 33 at a radial end thereof in the direction of the first axis (D1), and abut against the electrostatic-discharge protective component 391 at an axial end thereof in the direction of a second axis (D2) perpendicular to the first axes (D1). Referring to FIG. 10, in another modification, the first conductive mediums 392 may abut against the first electrical contact 332 of the circuit board 33 and lead portions 391*a* of the electrostatic-discharge protective component 391 at axial ends thereof in the direction of the first axis (D1). By virtue of the casing-shaped connecting port 36 and the electrostatic-discharge protective component 391 that is shaped to correspond the connecting port 36 and that cooperates with the connecting port 36 to limit the resilient first conductive mediums 392, the structure of the transmitter 3 is stabilized and miniaturized for stably dispelling the static electricity.

In a modification, the electrostatic-discharge protective component 391 of the electrostatic-discharge protective unit 39 may be a conductive layer that is applied on the outer surface 361 of the connecting port 36 through a sputtering or spraying technique. As such, the electrostatic-discharge protective unit 39 is able to bear and dispel the unbalanced electric charges when electrostatic discharge occurs.

Figure 14:
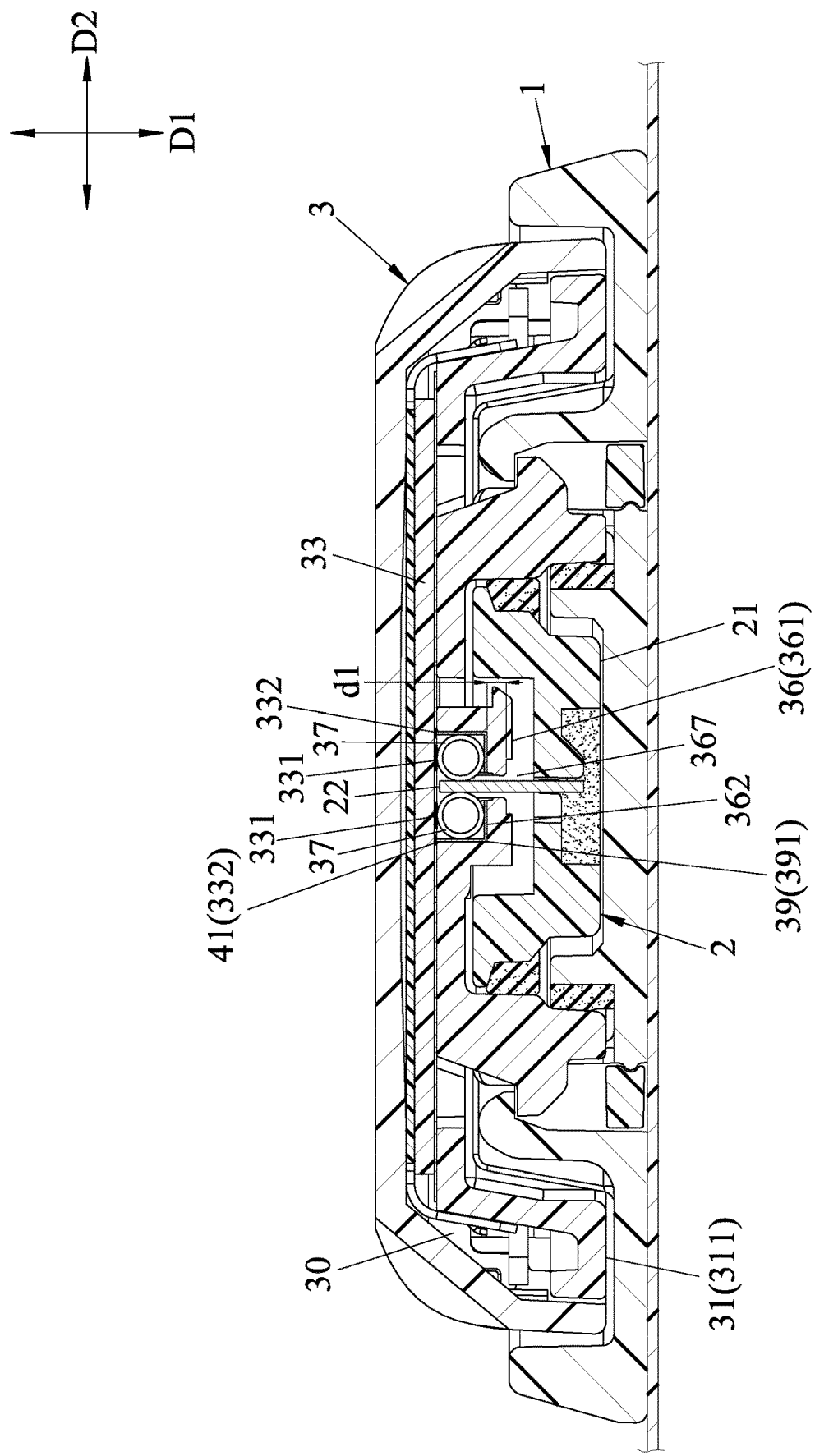
FIG. 14 is a sectional view illustrating still another modification of the first embodiment.

Referring to FIG. 14, in a modification of the embodiment, the electrostatic-discharge protective component 391 is configured to be disposed on an inner surface 362 of the connecting port 36 rather than on the outer surface 361 of the connecting port 36, and surrounds the periphery of the socket 367. In this modification, the electrostatic-discharge protective component 391 is directly and electrically coupled to the first electrical contact 332 of the circuit board 33 so as to form an electrostatic discharge path that is distal from the to-be-protect components (e.g., the processing unit 34 on the circuit board 33). As such, the electrostatic-discharge protective component 391 can conduct the unbalanced electric charges to the first electrical contacts 332 (i.e., the ground points) to be grounded when electrostatic discharge occurs, so as to prevent the to-be-protect components, such as the electronic components in the circuit board 33, from being damaged by the static electricity. Specifically, the electrostatic-discharge protective component 391 is configured as a conductive layer that is disposed on an inner surface 362 of the connecting port 36, and that is insulated from the second conductive mediums 37 by further treatment.

Figure 15:
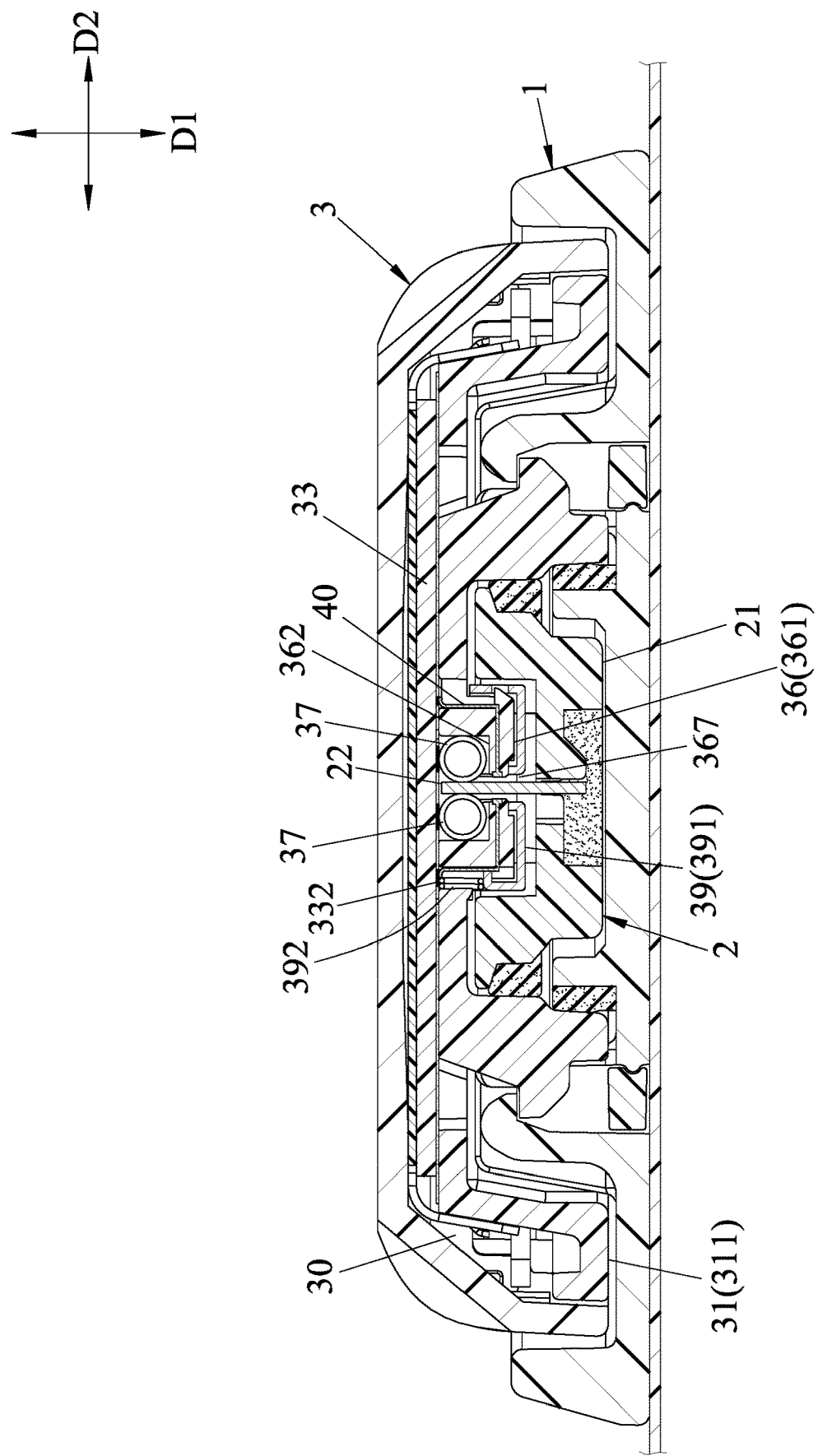
FIG. 15 is a sectional view illustrating still another modification of the first embodiment.

Referring to FIG. 15, in another modification, the transmitter 3 further includes an additional electrostatic-discharge protective unit 40 that is embedded in the connecting port 36 during an injection molding process of the connecting port 36, that is located between the outer surface 361 and the inner surface 362 of the connecting port 36, and that is disposed adjacent to the socket 367. The additional electrostatic-discharge protective unit 40 protrudes out of the connecting port 36 to be directly and electrically coupled to the first electrical contact 332 of the circuit board 33, or electrically coupled to the first electrical contact 332 of the circuit board 33 via the first conductive medium 392 so as to serve as a secondary protection means that conducts the unbalanced electric charges to the first electrical contacts 332 (i.e., the ground points) when electrostatic discharge occurs, so as to prevent the to-be-protect components from being damaged by the static electricity. Specifically, the additional electrostatic-discharge protective unit 40 can be configured as a conductive wire that is disposed in the connecting port 36, but is not limited to such.

According to the above, in this embodiment, the sensing member 22 and the circuit board 33 are electrically coupled via the second conductive mediums 37, and the electrostatic-discharge protective unit 39 is disposed at the periphery of the socket 367 so as to prevent the static electricity from being accumulated at the periphery of the socket 367. By such, the electrostatic-discharge protective unit 39 bears and dispels the unbalanced charges (current) at the periphery of the socket 367 for preventing the sensing member 22 that is proximate to the socket 367 and the inner components of the transmitter 3 (e.g., the circuit board 33 and the processing unit 34) from being damaged by the static electricity via the socket 367 when the electrostatic discharge occurs.

Figure 16:
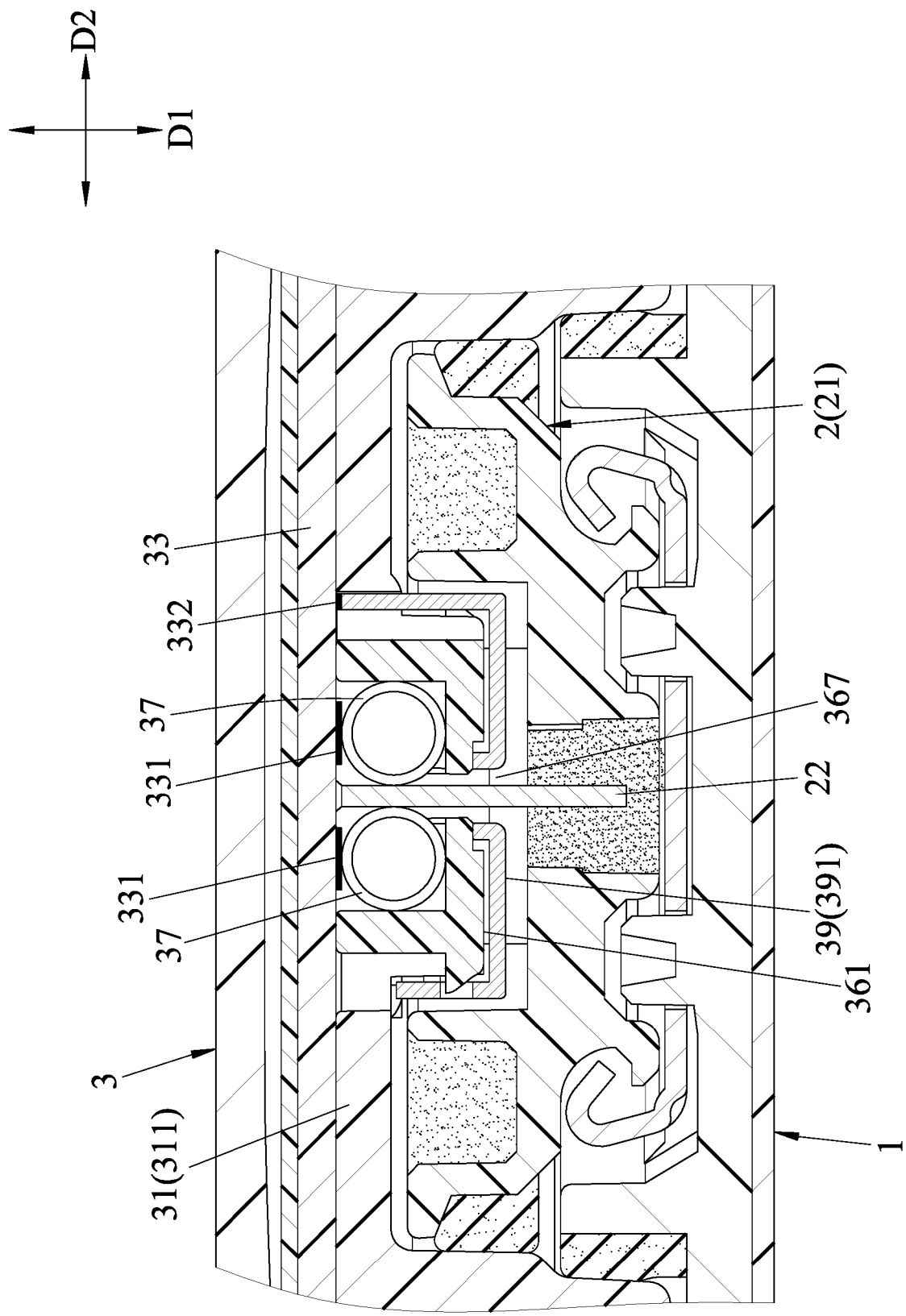
FIG. 16 is a fragmentary sectional view illustrating a second embodiment of a physiological signal monitoring device according to the disclosure.

Referring to FIG. 16, a second embodiment of the physiological signal monitoring device with an electrostatic-discharge protective mechanism according to the disclosure is similar to the first embodiment. The differences are as follows:

In the second embodiment, the first conductive medium(s) 392 is omitted, and the electrostatic-discharge protective component 391 extends into the inner space 30 in the direction of the first axis (D1) to directly and electrically coupled to the first electrical contact 332 (i.e., the low potential point) on the circuit board 33 for dispelling the unbalanced charges.

Figure 17:
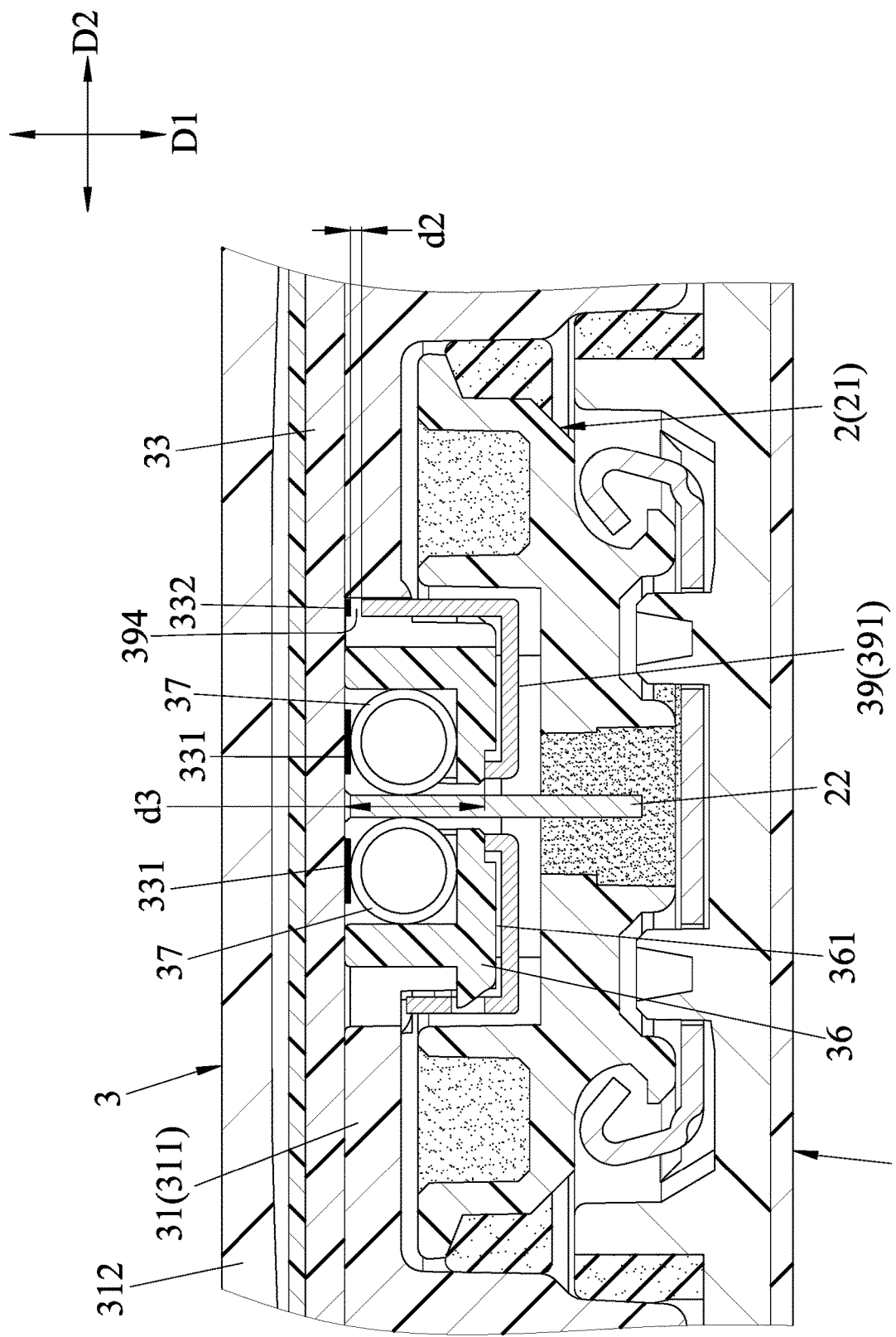
FIG. 17 is a fragmentary sectional view illustrating a third embodiment of a physiological signal monitoring device according to the disclosure.

Referring to FIG. 17, a third embodiment of the physiological signal monitoring device with an electrostatic-discharge protective mechanism according to the disclosure is similar to the second embodiment. The differences are as follows:

In the third embodiment, there is a discharge gap 394 between the electrostatic-discharge protective component 391 and the first electrical contact 332 (i.e., the low potential point) on the circuit board 33. By such, the electrostatic-discharge protective component 391 can dispel the unbalanced charges onto the circuit board 33 via air-discharge. The length of the discharge gap 394 is smaller than a distance between the socket 367 and a to-be-protect component in the inner space 30.

Referring to FIGS. 14 and 17, a minimum distance between the electrostatic-discharge protective component 391 and the socket 367 is d1 (see FIG. 14), a minimum distance between the electrostatic-discharge protective component 391 and the first electrical contact 332 is d2 (i.e., the discharge gap 394, see FIG. 17), and a distance between the socket 367 and the circuit board 33 is d3 (see FIG. 17). The unbalanced charges can be dispelled via the electrostatic-discharge protective component 391 under the circumstances: d1+d2<d3. It should be noted that, in the third embodiment (see FIG. 17), d1 is zero.

Figure 18:
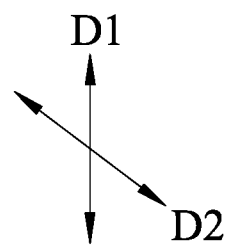
FIG. 18 is a perspective view illustrating an assembly of a connecting port, a plurality of second connective mediums and an electrostatic-discharge protective unit of a fourth embodiment of a physiological signal monitoring device according to the disclosure.
Figure 18:
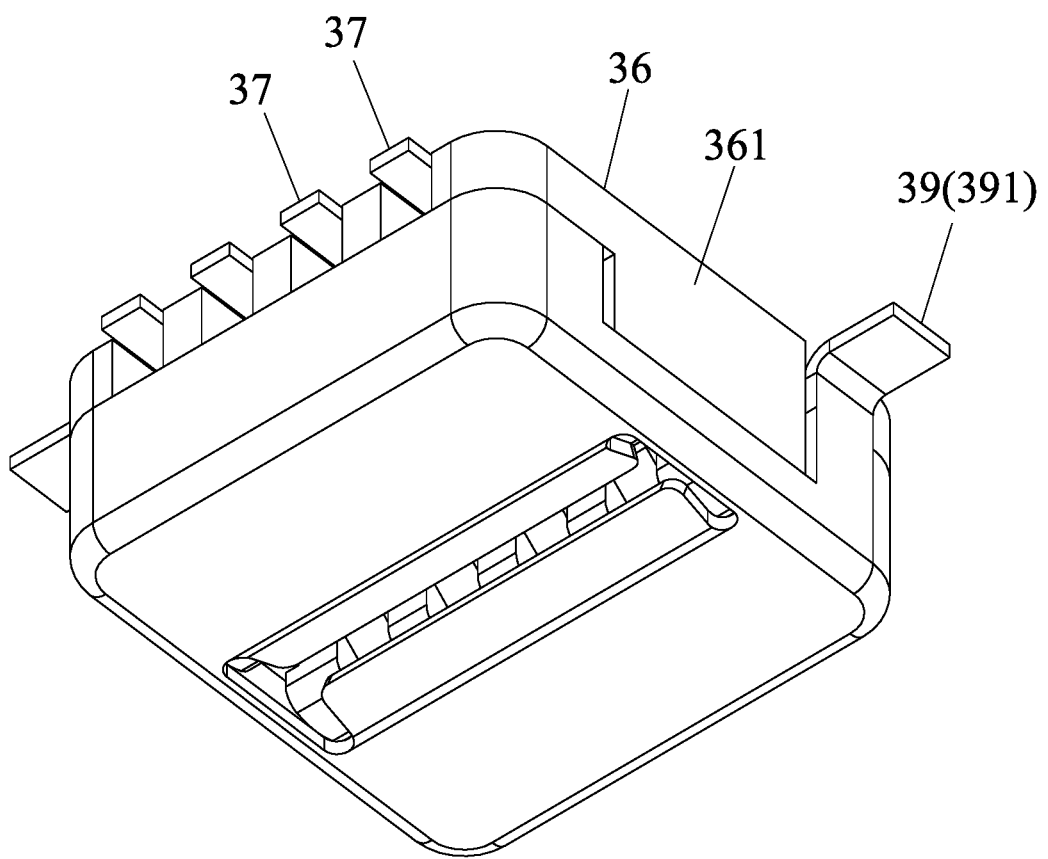
Figure 19:
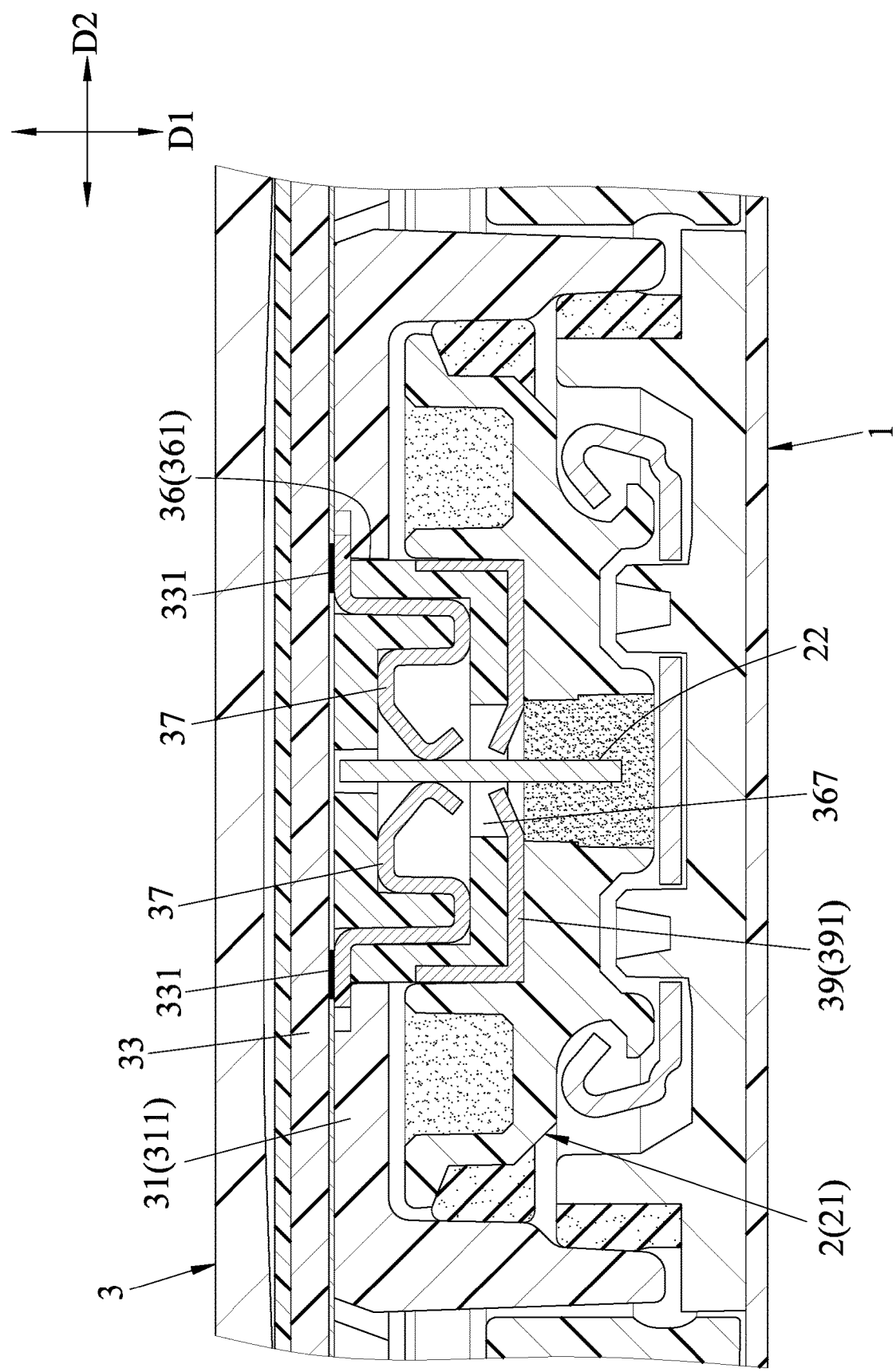
FIG. 19 is a fragmentary sectional view illustrating the fourth embodiment.

Referring to FIGS. 18 and 19, a fourth embodiment of the physiological signal monitoring device with an electrostatic-discharge protective mechanism according to the disclosure is similar to the second embodiment. The differences are as follows:

In the fourth embodiment, an assembly cooperatively constituted by the connecting port 36, the second conductive mediums 37 and the electrostatic-discharge protective unit 39 is in the form of an electrical connector, and is mounted onto the circuit board 33 through, but not limited to, a surface mount technology (SMT) to extend through the bottom portion 311 of the casing 31. Wherein, each of the second conductive mediums 37 is configured as a resilient plate, and protrudes out of the outer surface 361 of the connecting port 36 to form a lead portion. The electrostatic-discharge protective component 391 of the electrostatic-discharge protective unit 39 is configured as a metal casing, and formed with lead portions at two lateral sides thereof.

Specifically, when the sensing member 22 is inserted into the transmitter 3 via the socket 367, each of the second conductive mediums 37 is in contact with the outputs of the electrodes 226 or the electrical contact regions 227 on the signal output section 221 of the sensing member 22 at one side thereof, and is in contact with the second electrical contacts 331 on the circuit board 33, so that the sensing member 22 is electrically coupled to the circuit board 33. At the same time, the electrical connector cooperatively constituted by the connecting port 36, the second conductive mediums 37 and the electric-discharge protective unit 39 is mounted on the circuit board 33, and the lead portions of the electrostatic-discharge protective component 391 is able to conduct unbalanced charges to the first electrical contacts 332 on the circuit board 33 through direct contact (the second embodiment) or air-discharge (the third embodiment).

Figure 20:
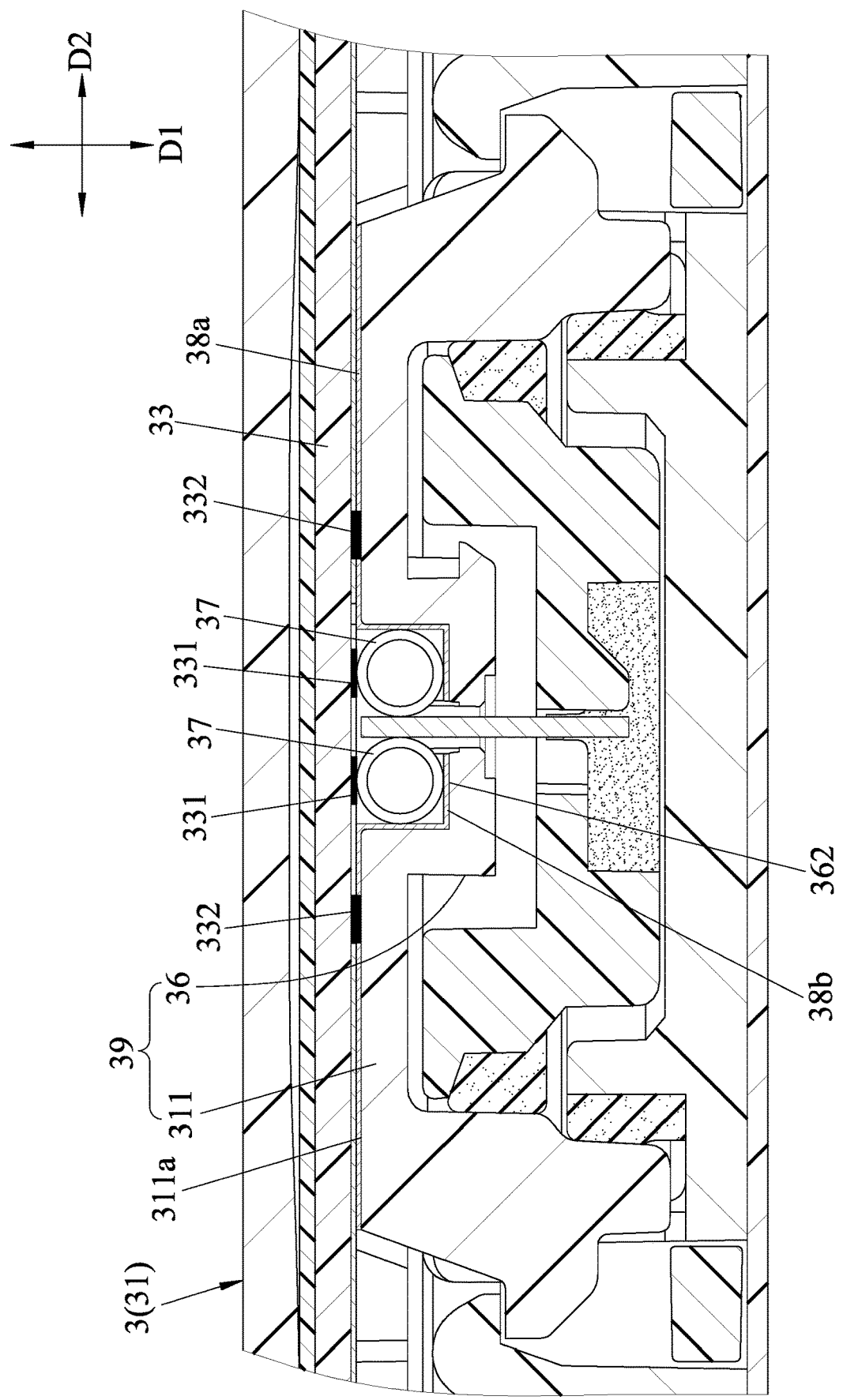
FIG. 20 is a fragmentary sectional view illustrating a fifth embodiment of a physiological signal monitoring device according to the disclosure.

Referring to FIG. 20, a fifth embodiment of the physiological signal monitoring device with an electrostatic-discharge protective mechanism according to the disclosure is similar to the first embodiment. The differences are as follows:

In the fifth embodiment, the connecting port 36 is made of a conductive material. Specifically, the connecting port 36 and the bottom portion 311 of the casing 31 are made of a conductive material, and are formed as one piece to serve as the electrostatic-discharge protective unit 39 that bears and dispels unbalanced charges when the electrostatic discharge occurs.

In addition, an inner surface 311a of the bottom portion 311 of the casing 31 of the transmitter 3 is partially provided with an insulation portion 38a that is at least located between the bottom portion 311 of the casing 31 and the circuit board 33. The inner surface 362 of the connecting port 36 is provided with another insulation portion 38b that is located between the inner surface 362 of the connecting port 36 and the second conductive medium 37 so as to prevent short circuit between the second conductive medium 37 and electronic components on the circuit board 33. The insulation portions 38a, 38b may be formed on the inner surface 311a of the bottom portion 311 of the casing 31 and the inner surface 362 of the connecting port 36 through anodizing treatment or spraying, or may be insulation components that are mounted on the inner surface 311a of the bottom portion 311 of the casing 31 and the inner surface 362 of the connecting port 36.

A portion of the inner surface 311a of the bottom portion 311 of the casing 31 is not provided with the insulation portions 38a, and is electrically coupled to the first electrical contacts 332 on the circuit board 33, so as to dispel the unbalanced charges via the circuit board 33.

In a modification, the transmitter 3 may include at least one first conductive medium (not shown in FIG. 20, referring to FIGS. 7, 9 and 10) that is located between the circuit board 33 and the portion of the inner surface 311a of the bottom portion 311 of the casing 31 that is not provided with the insulation portions 38a, so that the bottom portion 311 of the casing 31 is electrically coupled to the circuit board 33 to dispel the unbalanced charges via the circuit board 33.

In summary, the electrostatic-discharge protective unit 39 bears and dispels the unbalanced charges (current) at the periphery of the socket 367 for preventing the sensing member 22 that is inserted into the socket 367 of the transmitter 3 and the inner components of the transmitter 3 from being damaged by the static electricity via the socket 367 when the electrostatic discharge occurs.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A physiological signal monitoring device adapted for monitoring a physiological parameter of at least one analyte of a host, comprising:
a base adapted to be mounted to a skin surface of the host, and provided with a biosensor, the biosensor having a sensing section and a signal output section, the sensing section of the biosensor being adapted to be inserted underneath the skin surface of the host for measuring at least one physiological signal corresponding to the physiological parameter of the host, and outputting the physiological signal via the signal output section; and
a transmitter removably coupled to the base, and including
a casing that defines an inner space therein for receiving a circuit board and that has a connecting surface facing the base, the connecting surface being provided with a connecting port, the connecting port having a socket that is communicated with the inner space and that is for the signal output section of the biosensor to be removably inserted thereinto, to permit the biosensor to be coupled to the circuit board and to output the physiological signal to the circuit board for processing the physiological signal, and
an electrostatic-discharge protective unit that is at least disposed at the periphery of the socket of the connecting port for bearing and dispelling static electricity when electrostatic discharge occurs;
wherein the electrostatic-discharge protective unit includes an electrostatic-discharge protective component that covers an outer surface of the connecting port,
wherein the electrostatic-discharge protective component is disposed on the connecting port and is at least adjacent to a periphery of the socket, the electrostatic-discharge protective unit further including at least one first conductive medium that is in contact with the electrostatic-discharge protective component, the electrostatic-discharge protective component being electrically coupled to a potential balance unit via the first conductive medium,
wherein the first conductive medium of the electrostatic-discharge protective unit of the transmitter is configured as a coil spring and abuts against the electrostatic-discharge protective component and the potential balance unit at two radial ends or two axial ends thereof,
wherein the inner space of the transmitter is provided with a plurality of second conductive mediums that are mounted in the connecting port, each of the second conductive mediums being in contact with the circuit board at a side thereof, and
wherein, when the signal output section of the biosensor is inserted into the connecting port of the transmitter via the socket, each of the second conductive mediums is in contact with the signal output section of the biosensor at another side thereof, so that the biosensor is electrically coupled to the circuit board via the second conductive mediums.

2. The physiological signal monitoring device as claimed in claim 1, wherein the electrostatic-discharge protective component is configured as a conductive layer that is applied on the outer surface of the connecting port.

3. The physiological signal monitoring device as claimed in claim 1, wherein the electrostatic-discharge protective unit further includes an additional electrostatic-discharge protective component, the additional electrostatic-discharge protective component being located in the inner space of the casing, and being electrically coupled to a potential balance unit so as to form an electrostatic discharge path that is distal from a to-be-protect components.

4. The physiological signal monitoring device as claimed in claim 3, wherein the electrostatic-discharge protective component is configured as a conductive layer that is applied on an inner surface of the connecting port.

5. The physiological signal monitoring device as claimed in claim 1, wherein the connecting port of the transmitter is in the form of an electrical connector, and is mounted onto the circuit board to extend through the connecting surface of the casing.

6. The physiological signal monitoring device as claimed in claim 1, wherein:
the inner space of the transmitter is further provided with:
a battery that is coupled to the circuit board, and
a processing unit that is disposed on the circuit board; and
when the signal output section of the biosensor is inserted into the connecting port of the transmitter via the socket, the biosensor is electrically coupled to the circuit board to allow the biosensor to perform measurement of the analyte and send the physiological signal to the processing unit on the circuit board to be processed.

7. A physiological signal monitoring device adapted for monitoring a physiological parameter of at least one analyte of a host, comprising:
a base adapted to be mounted to a skin surface of the host, and provided with a biosensor, the biosensor having a sensing section and a signal output section, the sensing section of the biosensor being adapted to be inserted underneath the skin surface of the host for measuring at least one physiological signal corresponding to the physiological parameter of the host, and outputting the physiological signal via the signal output section; and
a transmitter removably coupled to the base, and including a casing that defines an inner space therein for receiving a circuit board, the casing having a side that faces the base and that is provided with a connecting port, the connecting port having a socket that is communicated with the inner space and that is for the signal output section of the biosensor to be removably inserted thereinto, so as to permit the biosensor to be coupled to the circuit board and to output the physiological signal to the circuit board for processing the physiological signal;
wherein at least the connecting port of the casing is made of a conductive material to serve as an electrostatic-discharge protective unit that is for bearing and dispelling static electricity when electrostatic discharge occurs,
wherein the transmitter further includes at least one first conductive medium that is configured as a coil spring and that abuts against the circuit board and the casing at two radial ends or two axial ends thereof, wherein the inner space of the transmitter is provided with a plurality of second conductive mediums that are mounted in the connecting port, each of the second conductive mediums being in contact with the circuit board at a side thereof, and wherein, when the biosensor is inserted into the connecting port of the transmitter via the socket, each of the second conductive mediums is in contact with a portion of the biosensor that is inserted into the connecting port at another side thereof, so that the biosensor is electrically coupled to the circuit board via the second conductive mediums.

8. The physiological signal monitoring device as claimed in claim 7, wherein:

the inner space of the transmitter is further provided with:
a battery that is coupled to the circuit board, and
a processing unit that is disposed on the circuit board; and when the biosensor is inserted into the connecting port of the transmitter via the socket, the biosensor is electrically coupled to the circuit board to allow the battery to supply power to the circuit board, and to allow the biosensor to perform measurement of the analyte and send the physiological signal to the processing unit on the circuit board to be processed.

9. The physiological signal monitoring device as claimed in claim 8, further comprising an insulation portion that is located between an inner surface of the connecting port of the transmitter and the second conductive mediums.

* * * * *